US006695207B1

(12) United States Patent
Norris, Jr.

(10) Patent No.: US 6,695,207 B1
(45) Date of Patent: Feb. 24, 2004

(54) SYSTEM FOR SECURE, IDENTITY AUTHENTICATED, AND IMMEDIATE FINANCIAL TRANSACTIONS AS WELL AS ACTIVATION OF VARIED INSTRUMENTALITIES

(76) Inventor: Carroll Boyd Norris, Jr., c/o Quality Auto Glass, 3700 Osuna NE., Suite 512, Albuquerque, NM (US) 87109-4445

( * ) Notice: Subject to any disclaimer, the term of this patent is extended or adjusted under 35 U.S.C. 154(b) by 0 days.

(21) Appl. No.: 09/498,140

(22) Filed: Feb. 4, 2000

(51) Int. Cl.$^7$ ................................................. G06K 5/00
(52) U.S. Cl. ...................... 235/382; 235/380; 235/385; 705/18; 705/1; 705/22
(58) Field of Search ............................... 235/382, 380, 235/385; 705/18, 1, 22

(56) References Cited

U.S. PATENT DOCUMENTS

| | | | |
|---|---|---|---|
| 4,003,152 A | 1/1977 | Barker et al. | |
| 4,078,154 A | 3/1978 | Suzuki et al. | |
| 4,234,868 A | 11/1980 | Radice | |
| 4,354,189 A | 10/1982 | Lemelson | |
| 4,403,869 A | 9/1983 | Crutcher | |
| 4,536,647 A | * 8/1985 | Atalla et al. ................... | 705/70 |
| 4,952,913 A | 8/1990 | Pauley et al. | |
| 5,062,232 A | 11/1991 | Eppler | |
| 5,168,114 A | 12/1992 | Enget | |
| 5,204,672 A | 4/1993 | Brooks | |
| 5,241,161 A | 8/1993 | Zuta | |
| 5,537,102 A | 7/1996 | Pinnow | |
| 5,608,784 A | 3/1997 | Miller | |
| 5,623,539 A | 4/1997 | Bassenyemykasa et al. | |
| 5,796,858 A | 8/1998 | Zhou et al. | |
| 5,811,897 A | 9/1998 | Spaude et al. | |
| 5,828,301 A | 10/1998 | Sanchez | |
| 5,845,733 A | 12/1998 | Wolfsen | |
| 5,852,670 A | 12/1998 | Setlak et al. | |
| 5,867,795 A | 2/1999 | Novis et al. | |
| 5,867,802 A | * 2/1999 | Borza ......................... | 340/5.53 |
| 5,914,701 A | 6/1999 | Gersheneld et al. | |
| 5,949,521 A | 9/1999 | Williams et al. | |
| 5,956,122 A | 9/1999 | Doster | |
| 5,963,679 A | 10/1999 | Setlak | |
| 6,041,410 A | * 3/2000 | Hsu et al. .................... | 713/186 |
| 6,256,616 B1 | * 7/2001 | Brookner .................... | 705/401 |
| 6,296,610 B1 | * 10/2001 | Schneider et al. .......... | 600/445 |
| 6,332,161 B1 | * 12/2001 | Sasson ........................ | 709/227 |
| 6,353,889 B1 | * 3/2002 | Hollingshead .............. | 713/169 |
| 6,367,017 B1 | * 4/2002 | Gray .......................... | 713/200 |
| 6,556,904 B1 | * 4/2003 | Larson et al. ................ | 701/33 |

* cited by examiner

Primary Examiner—Karl D. Frech
Assistant Examiner—Allyson Sanders
(74) Attorney, Agent, or Firm—Winstead Sechrest & Minick, P.C.

(57) ABSTRACT

The present invention concerns apparatus and methods for a family of electronic devices based on the concept of a Personalized Authenticated Controller (PAC). The PAC is able to recognize characteristics of an authorized person and allows only that person to rapidly communicate authenticated identification and requests to access, control and transact with many "smart" Instrumentalities designed with compatible communication capabilities. The PAC is conveniently combined with an electronic wristwatch and worn by its user. Personal Smart Instrumentalities, such as vehicles and firearms, will operate without difficulty for their owners but become worthless if stolen. Commercial Smart Instrumentalities, such as merchants and banks, can quickly communicate with the customer's PAC to establish positive personal identification and optionally charge purchases or transfer funds. Various security features are incorporated to ensure authentication of the customer and integrity of the transaction. One security feature is that an user-worn PAC immediately senses removal from an authorized person's body, which cancels authentication and also renders the PAC itself useless if stolen. Another security feature, useful for critical handheld instrumentalities such as firearms, uses the body of the user as a medium to conduct communication signals to the Smart Instrumentality, making these communications reliable and virtually unjammable.

24 Claims, 21 Drawing Sheets

THERE ARE 125 POSSIBLE COMBINATIONS WITH THE SCHEME ABOVE

SYSTEM FOR SECURE, IDENTITY AUTHENTICATED, AND IMMEDIATE FINANCIAL TRANSACTIONS AS WELL AS ACTIVATION OF VARIED INSTRUMENTALITIES

BACKGROUND OF THE INVENTION

The present invention concerns apparatus and methods for controlling access to activation of quite varied instrumentalities, for the purpose of allowing such access for only authorized persons. More specifically it concerns such a system for quickly, easily and automatically controlling authorized person access to a very wide variety of instrumentalities which a user may wish to activate, including, for example, electronic financial account systems, confidential data storage systems, electric appliances, and numerous other items of personal property, including, for example, vehicles, electronic door locks, and firearms.

In recent years there has been a great increase in criminal and fraudulent activities involving counterfeiting of personal identity, including, for example, credit card fraud, use of stolen or counterfeited bank checks, and other schemes by which a seller of goods or services, or a bank or other financial institution, is deceived as to the identity of a person to whom a sale is made, or to whom funds are provided.

Though sellers and banks often require a buyer to produce photographic identification, particularly in face-to-face sales transactions where checks are given or credit cards are used, or where checks are cashed, an increasing number of criminals have obtained equipment allowing production of authentic-looking but counterfeit -photographic personal identification documents, e.g. counterfeit drivers licenses, in which a photograph of the criminal is accompanied by valid identifying information about another person. And opportunities for fraud and criminal acts are even greater where no face-to-face transaction occurs, e.g. in use of credit cards to charge items ordered by phone. Criminals have often obtained credit card numbers and other valid identifying information on card holder fraud victims in varied ways, e.g. by stealing mail containing credit card bills or payments.

Conventional identification numerical codes, e.g. social security numbers and bank account numbers, offer no real security, for authentication of one's identity. One's bank account number is inherently disclosed to all of the persons and firms to whom one issues checks, and thus may easily come into possession of a criminal who prepares counterfeit checks. And one's social security number is also widely known, and generally accessible to anyone with a computer and internet access.

Though it is a fairly common practice to require that a person desiring to make a financial or sales transaction first manually input a personal identification number ("PIN") into an apparatus of the financial system involved, the use of PINs has serious disadvantages. Many people have difficulty in remembering PINs, and so it is a common practice for PINs to be written on cards carried in wallets or purses, so that the PINs are accessible to unauthorized persons if these are lost are stolen. Or, when a customer enters a PIN in a terminal at a sales counter in a crowded store when making a purchase, sales-persons or other customers may be able to observe the entry so as to learn the PIN. So, there is a serious security problem in use of the PIN approach for identity authentication. And, there are applications for the present invention, detailed below, in which even the brief time delay required for manual entry of a PIN may have serious disadvantages—in at least one case a literally fatal disadvantage.

Clearly there is a growing need for a very secure system, an apparatus and method, always available to an authorized person when he/she desires a transaction, to allow only that person to quickly and automatically activate a financial or other instrumentality which is to perform a useful function for that person.

The useful applications of such a system go far beyond use in sales or other financial transactions, and cover also a very wide variety of non-financial instrumentalities which the authorized person may regularly activate. For example, any item of personal property which performs some useful or desirable function, could be made subject to activation by only an authorized person, by such a system. Examples could include, but are not limited to motor vehicles, firearms, electric appliances, electric locks, sound systems, television sets, cameras, tape recorders, camcorders, and VCRs.

In order to be operable only by the authorized person through use of such a system, an instrumentality needs to itself possess one key element of the system, which might be generally described as "smart means", for recognizing personal identity authentication information to be provided by other elements of the system, and for allowing activation of the instrumentality only by the authorized person.

There is a need for such a system which may be used with any "smart" item of functional personal property, for a reason going far beyond the need to reduce criminal and fraudulent activity in financial transactions: All such items of smart personal property will be useless to thieves, because they simply will not function as intended after theft. So, as more and more items of personal property are manufactured and marked as being smart items, such a system offers the real possibility of eliminating the theft of all such items of functional personal property.

The need that such a system be always available to the authorized person, and the security need, are both served, in the present invention, by the approach of using a Personalized Authenticated Controller means apparatus (hereafter "PAC"), which authenticates identity of the authorized person and communicates with the smart instrumentality through a communication means, and using a PAC of a form which, in some versions of the invention, may be worn by the user, in contact with his body. Note that the term "his" is used only for brevity herein with reference to a user, without any intended limitation as to user gender.

The security need is met, with redundancy, by two features of the invention. In forms of the invention used by having the user make hand contact with the smart instrumentality, the communication means, allowing communication of identity authentication information between the PAC and the smart instrumentality, is, in one form of the invention, a means for allowing wave communication entirely through body tissues of the user, so that such communications may not readily be observed or interfered with by others.

And, in case the worn form of the PAC is removed from contact with the user's body, e.g. in being temporarily removed for bathing, another and redundant security feature is that the PAC includes means to both sense said removal and require re-authentication of identity when the PAC is once again in contact with a person's body.

The security need is also met, with redundancy, by use of a PAC which has means to continually determine that the PAC is worn by the user, e.g. by continually sensing unique identifying body characteristics of the user, e.g. retinal patterns, and/or periodically requiring the user to enter identifying information. This feature offers redundancy in relation to the means for sensing removal of the worn form of PAC and requiring reauthentication of identification after removal, since it will alternatively serve the security need even if there is a malfunction of, or intentional defeat of, the means for sensing removal of the PAC from the user's body.

Another security advantage of the invention is that the authorized person identity authentication signal, sent by the PAC to the instrumentality, will be a signal which will not contain the information which was received by the PAC from the user and used by the PAC to determine that the user is the authorized person. So, e.g., if the user enters a code number into the PAC, that code number never leaves the PAC.

The need for speed in allowing the user to activate the smart instrumentality is met by the present invention, because the PAC continually has the ability to instantly inform the smart instrumentality, at any time, not only that the user has issued an activation command for activation of the smart instrumentality, but also that he is the authorized person, rather than an unauthorized person. Serving the need for speed of identity authentication and smart instrumentality activation is particularly important in the case of such a system for use with a smart handgun. The smart handgun of course offers the great safety advantage that it may not be fired by the owner's child, or by an intruder who seeks to use it against its owner. But if the owner, wearing the PAC, picks up the smart handgun to defend his family against an intruder, the weapon may be fired immediately by the owner, who may thereby save lives of himself and family members. If the owner had to first enter a PIN into an apparatus, to activate the smart handgun, that small time delay might well be fatal to the owner, against an armed intruder.

The need for quick and automatic operation of the present invention, as well as the security need, is served in forms of the invention in which there is no PIN or other identifying information for the user to remember and reenter into the PAC, through inclusion in the PAC, of means to automatically sense unique personal identifying body characteristics of the user, e.g. fingerprint or retinal patterns, or the user's voice profile. In other forms of the invention however, for which it is. expected that periodic reentry of PIN or similar identifying information will not pose a problem, the PAC will periodically require re-authentication of identity by such means, but the PAC will, after each such reentry and until the next time reentry is required, remain instantly ready for activation of the smart instrumentality by the authorized person.

Finally, other less restrictive embodiments of the present invention would be suited to specialized needs as well as to transitional adaptation of the concepts and devices. For example, a simpler non-worn but handheld PAC, designed to emit a single authorized person identity authentication signal upon each authentication, could be used to transmit verification of this authentication in order to complete a single transaction. Such a PAC would be suitable for non time-critical occasional uses, but, most importantly, would represent the most rapid pathway of development to make possible secure and authenticated financial transactions and in particular secure and authenticated transactions over the internet. Such a PAC could be built into a personal computer, a computer keyboard, installed between a keyboard and a computer, built into a computer mouse (a natural form for a fingerprint reader), installed between a mouse and the computer, built into the computer motherboard, or built into the computer processor itself.

SUMMARY OF THE INVENTION

The invention is an apparatus and method for allowing only an authorized person to immediately activate varied instrumentalities which may include, without limitation, financial transaction systems, motor vehicles, electric appliances and firearms.

Said apparatus has a personalized authenticated controller means ("PAC"), comprising, in various claims, combinations of the following elements: a user information input means, for allowing input of information into said PAC; a data storage means, for storing data received by said PAC; a PAC microprocessor means, communicating internally with all PAC components, for transferring and formatting data, said PAC microprocessor means further comprising an authorized person identification means, communicating with said data storage means, for continually determining whether said user is said authorized person, through analysis of the most recently received data identifying said user and through comparison of same with reference data identifying said authorized person; and for providing for output from said PAC, of an authorized person identity authentication signal, if and only if said user is said authorized person.

In various claims said PAC further comprises an instrumentality activation means, for allowing said user to send an instrumentality activation signal to said instrumentality, indicating that said user wishes for said instrumentality to carry out said action; a user information output means, for allowing output of information from said PAC; a wearing means, for allowing said user to wear said PAC in contact with said user's body; a personal characteristics sensor means, for sensing unique identifying personal characteristics of said user, and for communicating data representing said characteristics to said data storage means; and a removal sensor means, communicating with said wearing means and said data storage means, for sensing removal of said PAC from said body of said authorized person and for communicating a removal signal indicative of said removal into said data storage means, and wherein said authorized person identification means further comprises means for determination of whether any said removal signal has been received into said data storage means after receipt of the most recent data identifying said user as said authorized person.

Said apparatus also has a communication means, for sending communications between said PAC and said instrumentality, which communications may be, without limitation, by wave communications of electromagnetic or sound waves; said communication means having, in some claims, communications security means, for reducing the risk of any unauthorized detection of or interference with said communications, which security means may include means for sending said communications through a path passing entirely through a portion of said user's body, where the portion of said instrumentality receiving said communications is covered by a portion of said user's body at the end of said path distal from said portion of said user's body in contact with said PAC, as where said instrumentality is in contact with said user's hand; and which security means may alternatively or additionally include means for encryption of said communications.

Said apparatus also comprises, in said instrumentality capable of performing action desired by said user, a portion of said instrumentality comprising an authorized person recognition means, communicating with said PAC through said communication means, for allowing activation of said instrumentality upon receipt of said instrumentality activation signal if and only if said PAC is currently being used by said authorized person; which instrumentality authorized person recognition means may further comprise means to determine whether said authorized person identity authentication signal is received from said PAC within a predetermined time interval before or after receipt of said instrumentality activation signal; or means to send an interrogation signal to said PAC after receipt of said instrumentality activation signal, asking for transmission of an authorized person identity authentication signal, and for determining whether said authorized person identity authentication signal is received by said instrumentality authorized person recognition means within a predetermined time interval after transmission of said interrogation signal.

Said method comprises continually determining whether or not a particular person who may seek to activate said instrumentality is the person who is authorized to do so, and allowing said instrumentality to be activated by said person if and only if said person is said authorized person.

DESCRIPTION OF THE PREFERRED EMBODIMENTS

Figure 1:
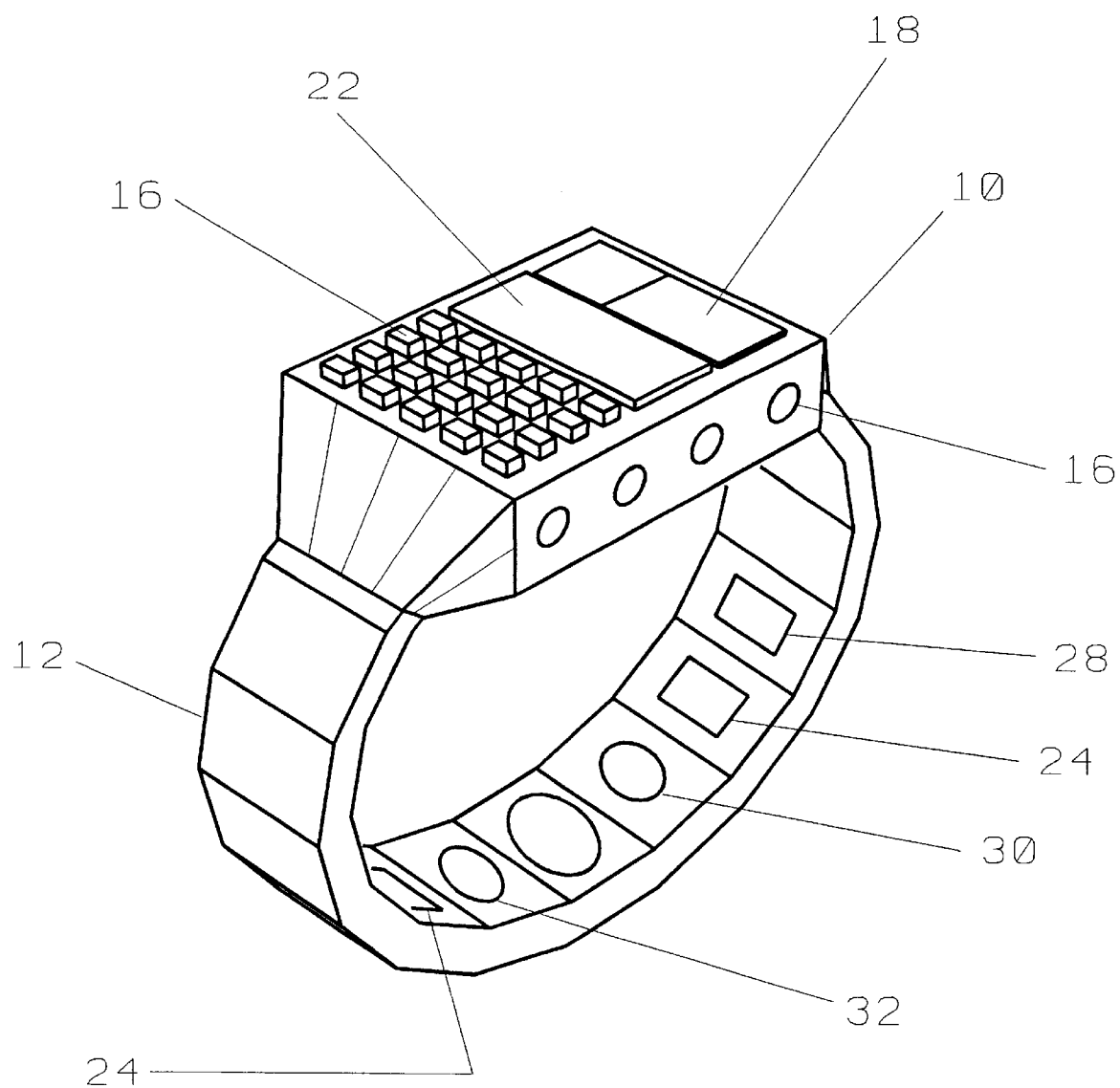
FIG. 1 is a perspective view of the personalized authenticated controller means ("PAC") of one embodiment of the invention.

Referring now to the drawings, in which like reference numbers denote like or corresponding elements, it is useful to first provide an overview of the main features of the principal embodiments; followed by a description of structural and operational details; concluding with a non-exhaustive review of some possible variations of structural details and applications of the invention, among embodiments of particular interest.

1. Overview of Main Features of Principal Embodiments

The personalized authenticated controller means ("PAC") 10, a device similar in appearance to a wristwatch, may be worn, by means of a wristband 12, on the user's wrist against the user's skin 14, wristband 12 thus constituting one possible wearing means, for allowing PAC 10 to be worn in contact with tissues of the user's body.

The PAC 10 also comprises a user information input means, and, for some embodiments as further discussed below, a user information output means. One possible form of user information input means is a keypad 16, whereby the user may input an activation command for desired activation of an instrumentality and may also input user identifying data. The user information input means may also include a voice receiving means 18, such as a microphone, for receiving user voice signals for user identification by voice profile and also for user voice command signals for activation of an instrumentality 20. For embodiments needing a user information output means, said means may be, for example an LCD screen 22, whereby the user may learn that instrumentality 20 has successfully been activated to perform action desired by the user, upon verification that the user is the authorized person. The matter of whether an embodiment will need to have a user information output means, in addition to a user information input means, is further discussed below in the section on variations of embodiments.

For some embodiments in which PAC 10 is worn by the user, PAC 10 also comprises a removal sensor means 24 for generating a removal signal indicating any removal of PAC 10 from the skin 14 of the user since the last authentication that the user is the authorized person.

Said keypad 16, voice receiving means 18, and removal sensor means 24 all are in communication with data storage means 26.

The PAC 10 also comprises a personal characteristics sensor means 28, connected to a data storage means 26, for sensing unique identifying characteristics of the user of PAC 10, which sensor means 28 may for example comprise means for sensing the fingerprint pattern of the user, or other unique identifying characteristics, as further discussed below.

The PAC 10 also comprises a transmitting means 30 for generating waves, which may be electromagnetic waves, to be sent to instrumentality 20, for conveying authorized person identity authentication signals and user commands for activation of instrumentality 20, and receiving means 32 for receiving waves, which may also be electromagnetic waves, sent to PAC 10 from instrumentality 20, which waves may convey an interrogation signal from instrumentality 20 to PAC 10, requesting that PAC 10 send to instrumentality 20 an authorized person identity authentication signal by waves propagated from transmitting means 30.

In the embodiment shown in FIGS. 1–4, the PAC 10 is used in activation of an instrumentality 20 having data input/output areas 34, containing means for receiving waves transmitted from PAC 10, which areas 34 may also contain means for generating waves to be sent to PAC 10.

Figure 2:
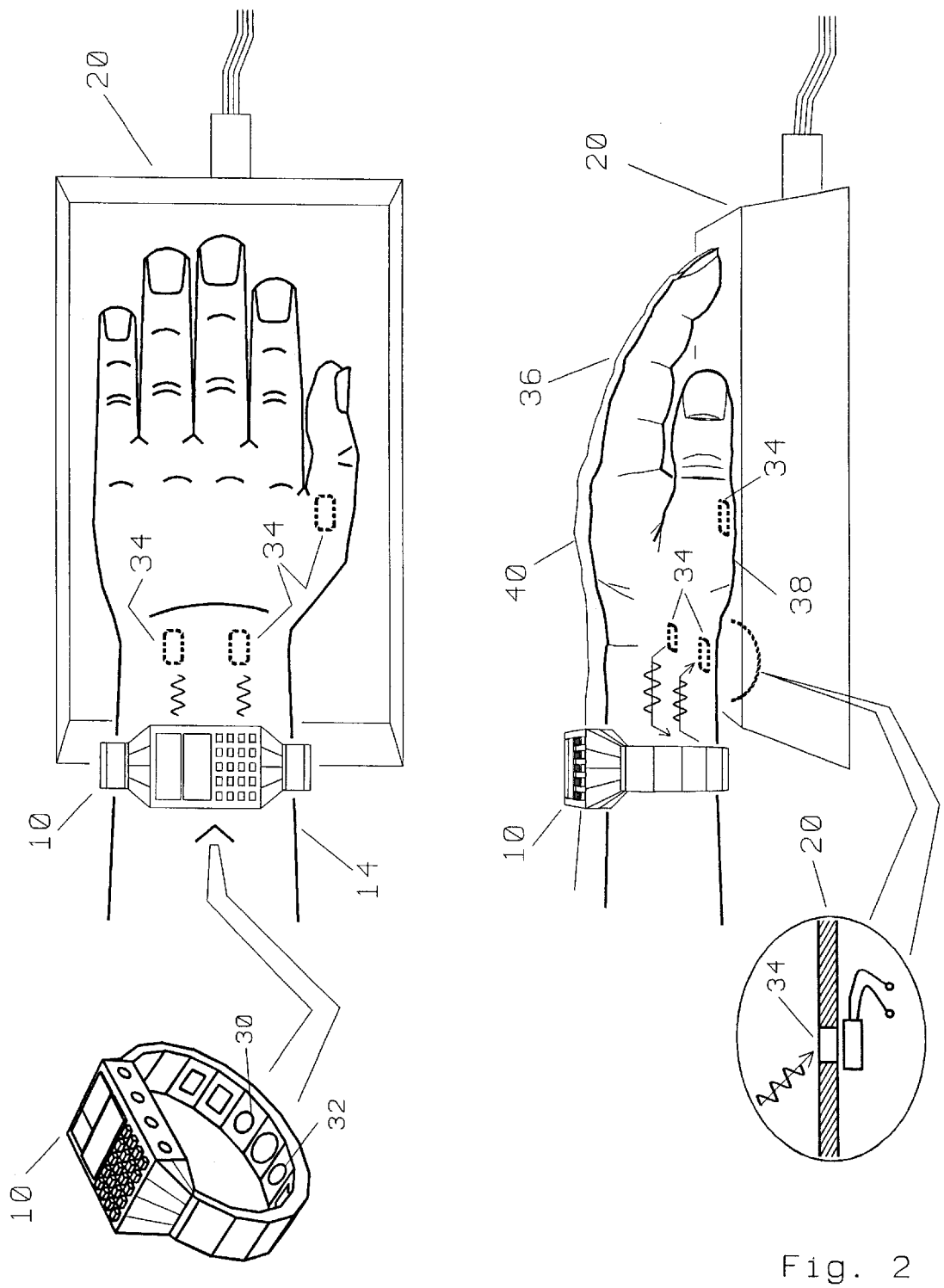
FIG. 2 shows both a plan view of a smart instrumentality control console and a side elevational view of the user's forearm and hand in contact with said console. In this illustration the PAC communicates with the instrumentality by waves passing through the user's body.

As seen in FIG. 2, in this embodiment the wave transmission of communications between PAC 10 and instrumentality 20, occurs entirely inside of the user's skin 14, within the body of the user. This is so because of the placement of transmitting means 30 and receiving means 32 entirely on the inside of wristband 12, as shown in FIG. 1, and because the user places his fingers 36 and the palm 38 of his hand 40 in contact with, and covering the data input/output areas 34 of instrumentality 20. So, it will be difficult for any unauthorized person to intercept or jam the communications, since they pass entirely through the user's body, for the entire path between PAC 10 and instrumentality 20.

This embodiment thus provides a communication means, for communications between the PAC 10 and the instrumentality 20, which communication means further comprises a communications security means, one possible form of which was described immediately above, for reducing the risk of unauthorized detection and/or interference with said communications.

Figure 3:
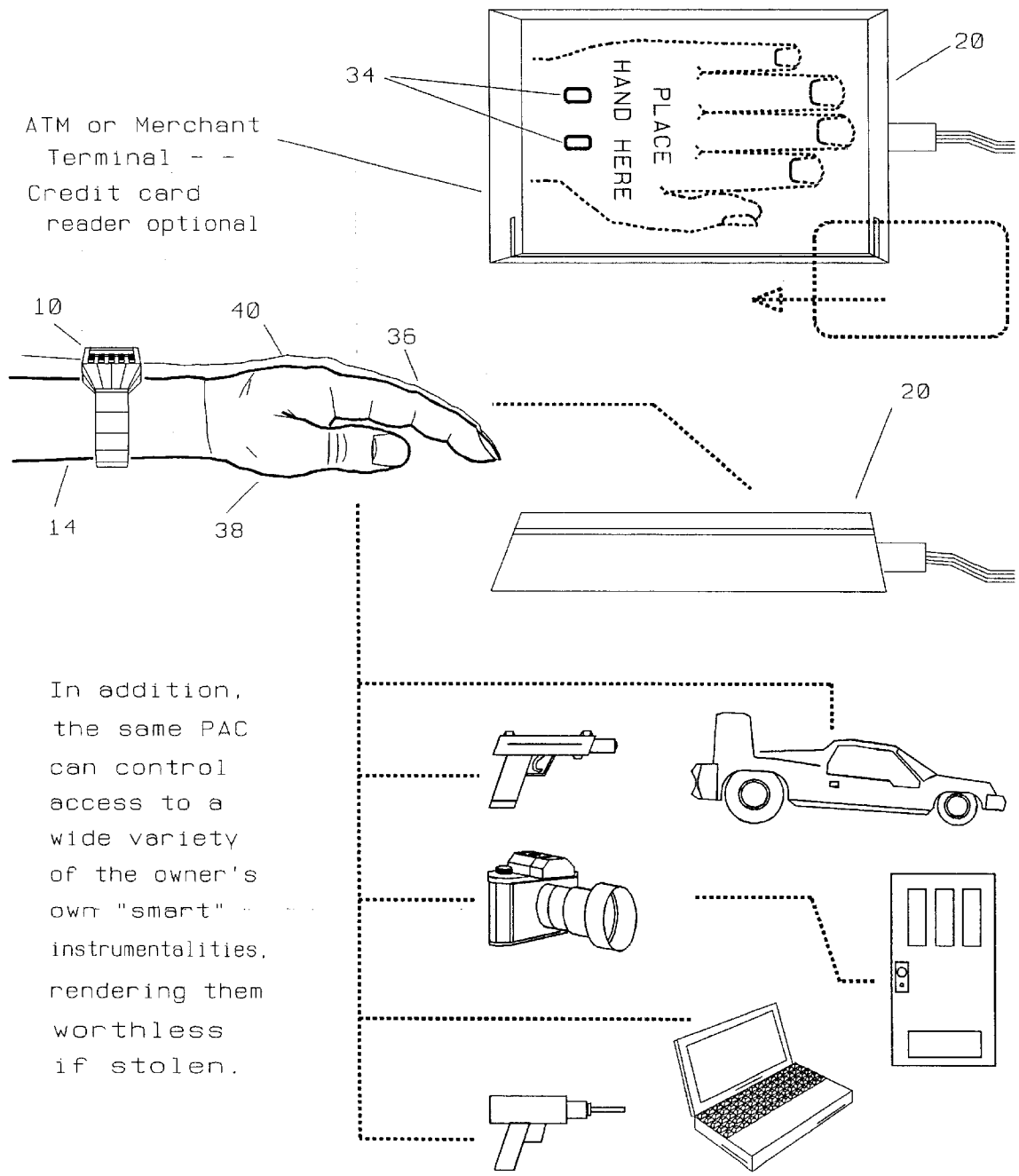
FIG. 3 illustrates the use of the invention with a variety of smart instrumentalities. In these cases communication occurs by waves passing through the user's body.

As illustrated in FIG. 3, this embodiment may be used with a very wide variety of smart instrumentalities 20, having data input/output areas 34 with which the user may make contact using his hand 40, including, for example, power drills, handguns, vehicles, door locks, and cameras.

Figure 4:
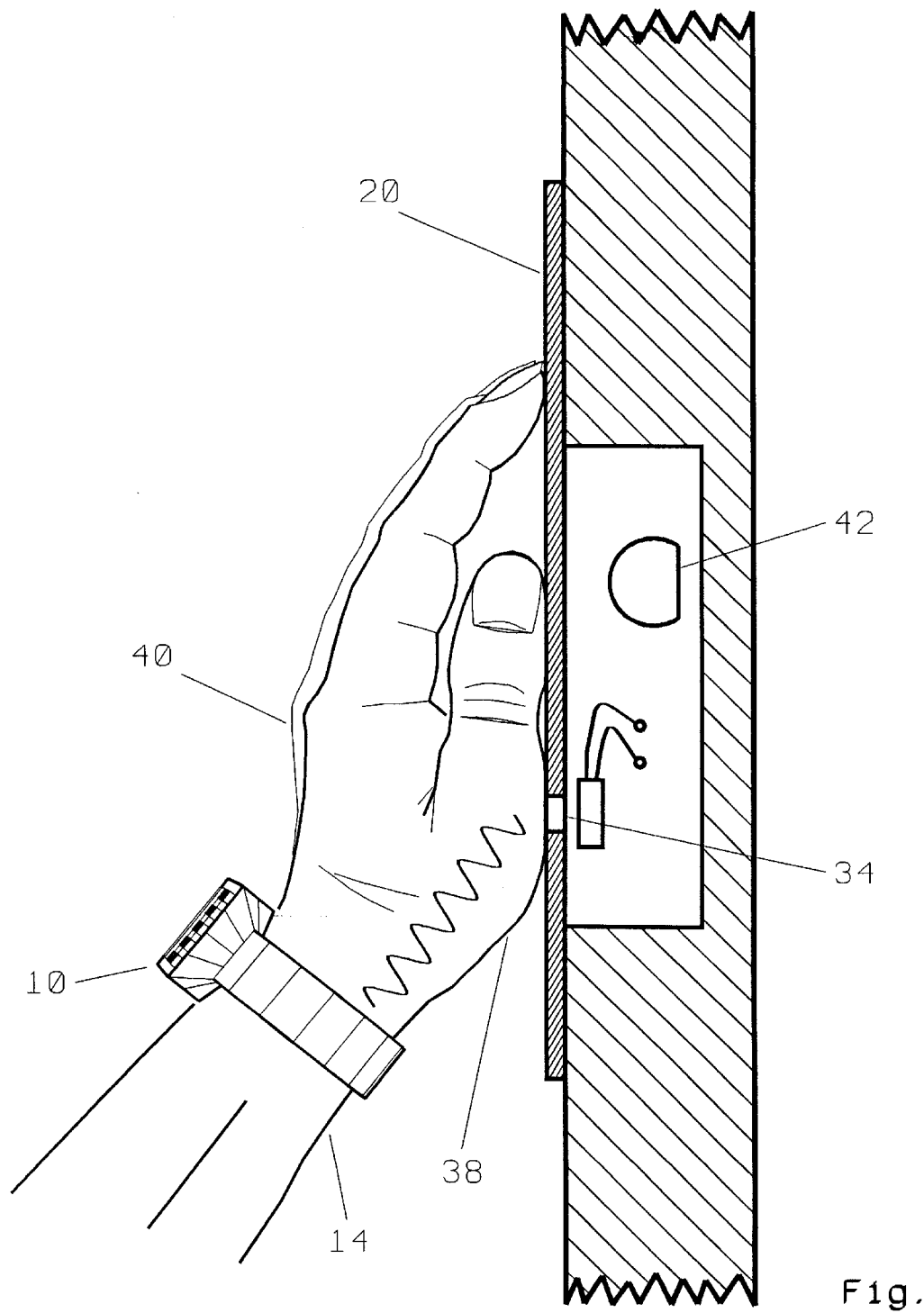
FIG. 4 is a side elevational view showing the use of the PAC embodiment of FIG. 1, in the control of a smart door lock.

FIG. 4 illustrates use of this embodiment of the PAC 10 with a smart door lock 42, in which use the communications pass from the PAC 10 through the user's hand 40 and his palm 38 into the data input/output areas 34 of door lock 42, and vice versa.

Figure 5:
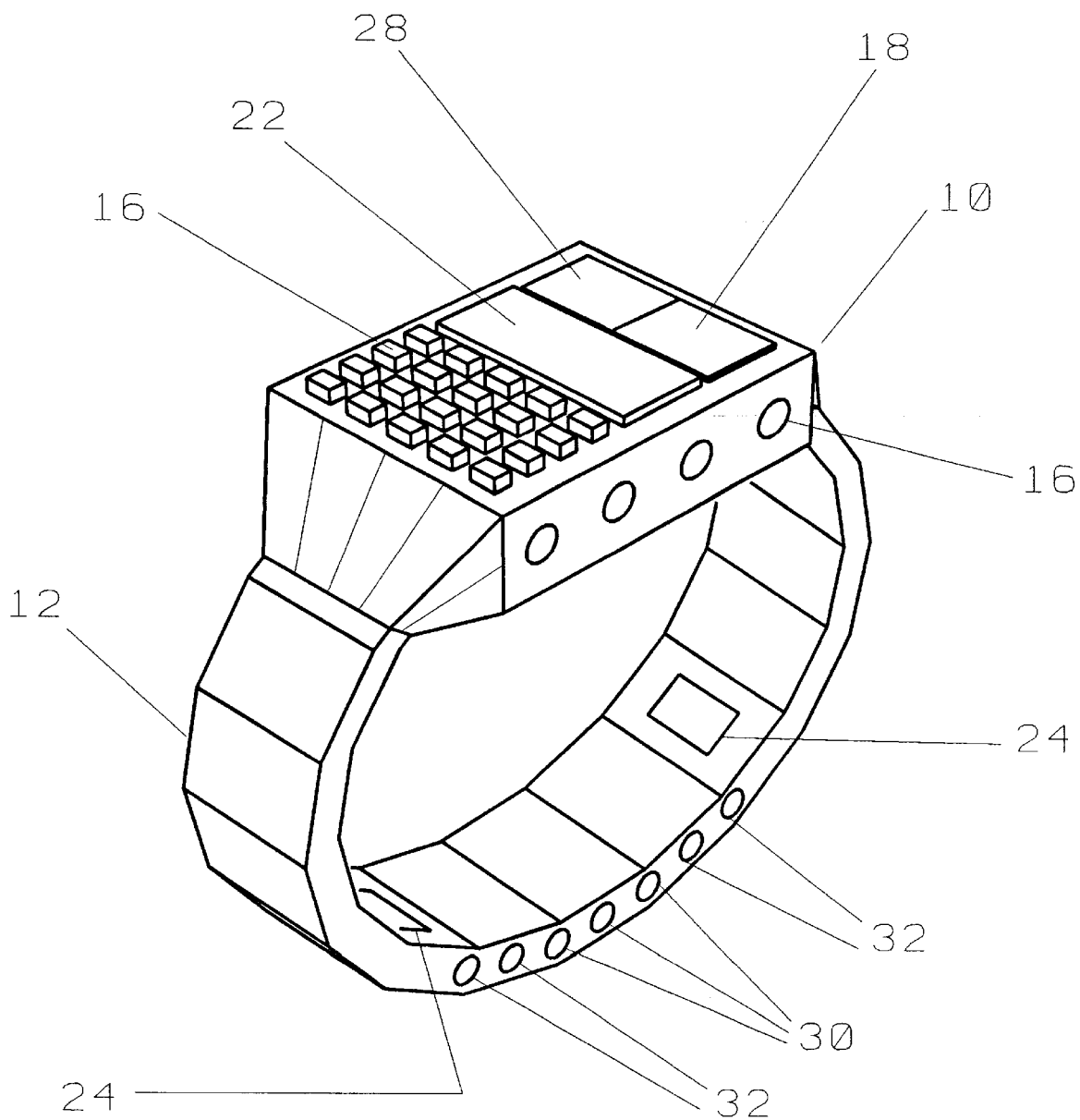
FIG. 5 is a perspective view of an alternate embodiment of the PAC, in which the PAC communicates with the instrumentality by direct line of sight, rather than through a portion of the body of the user.
Figure 6:
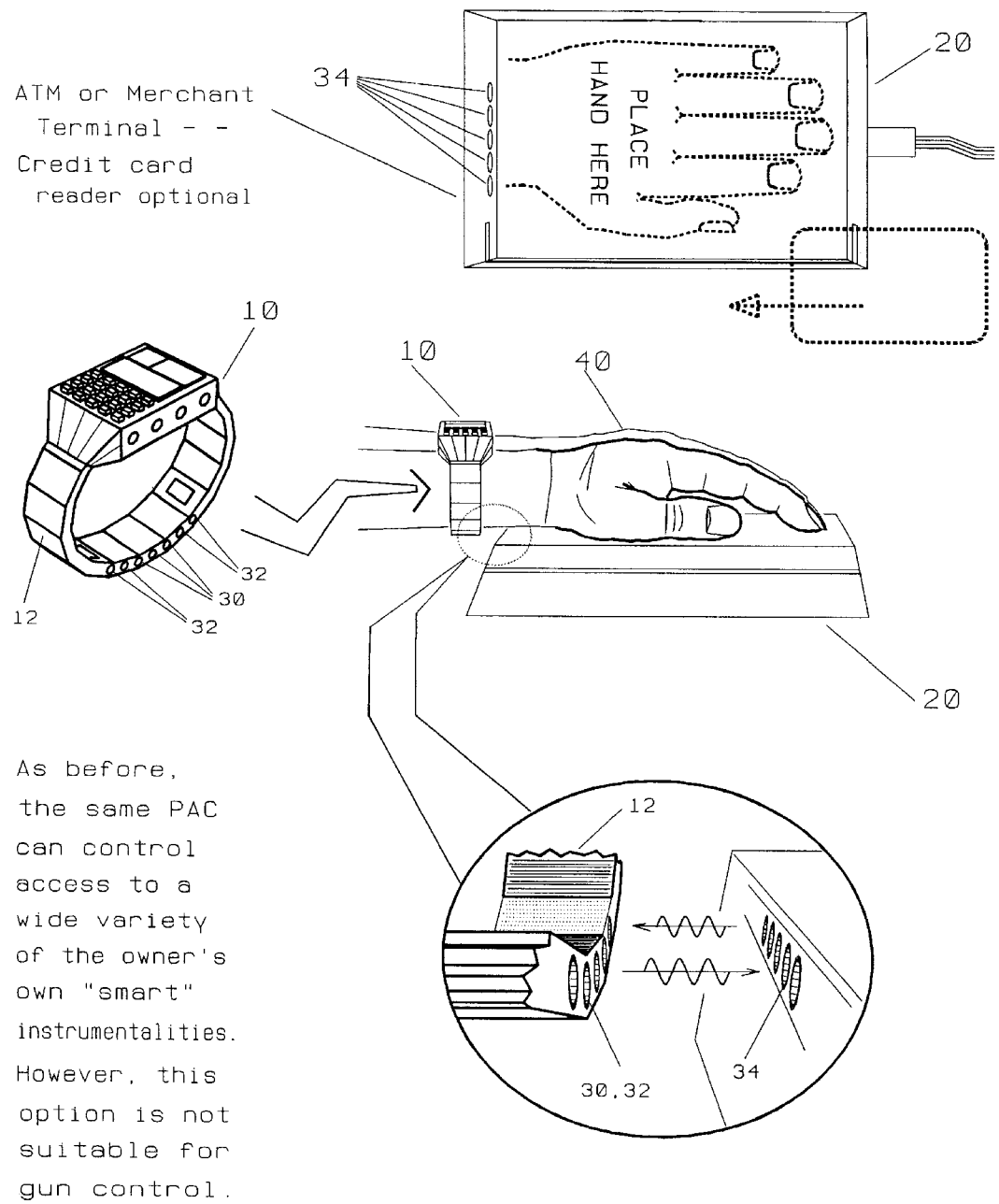
FIG. 6 shows both a plan view of a smart instrumentality control console and a side elevational view of the user's forearm and hand in contact with said console. In this illustration the PAC embodies the design of FIG. 5 which communicates with the instrumentality by direct line of sight.
Figure 7:
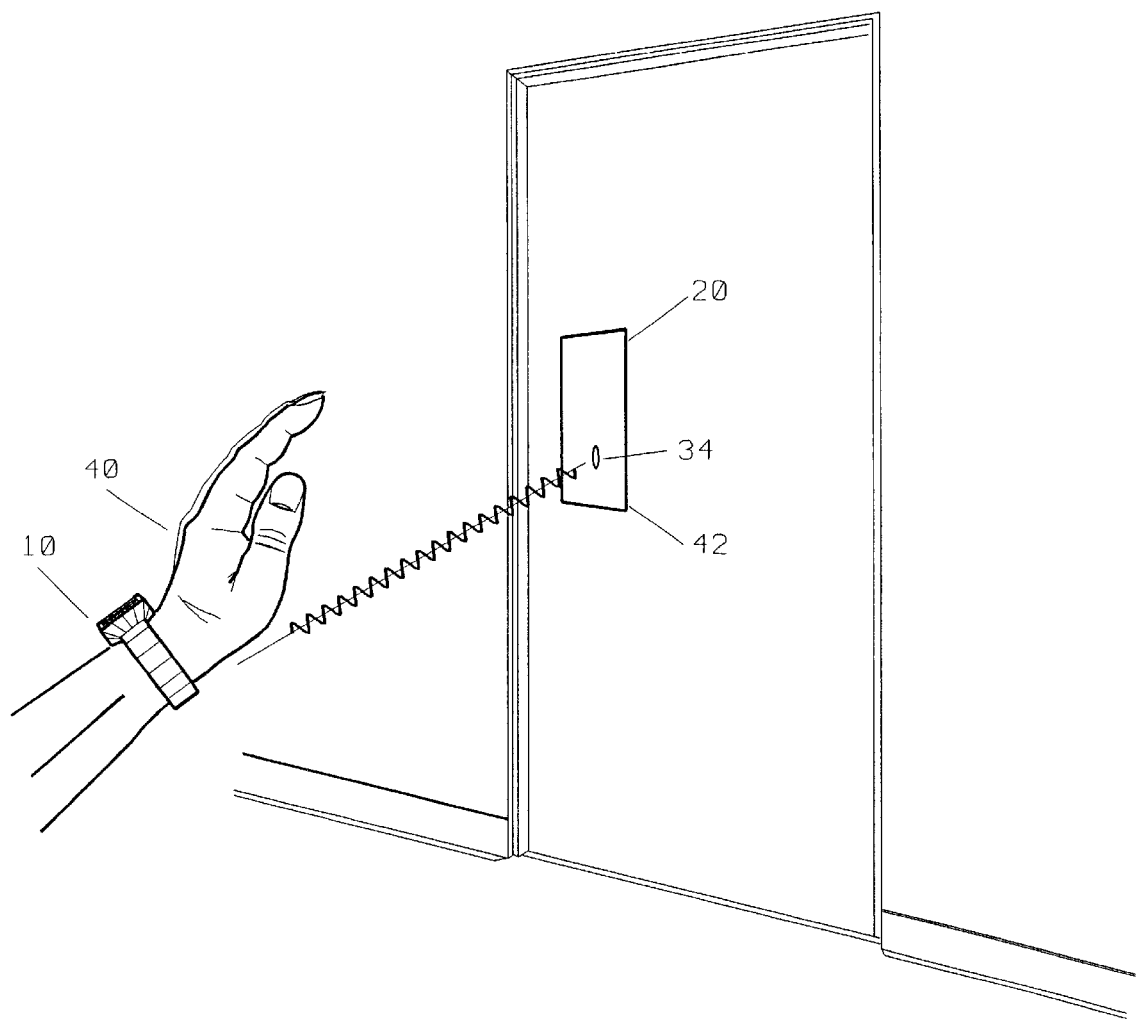
FIG. 7 is a perspective view showing use of the embodiment of the PAC shown in FIG. 5, in the control of a smart door lock which need not be touched by the user.

FIG. 5 illustrates an alternate embodiment of the invention, in which the PAC 10 is used in activation of an instrumentality 20 by direct line of sight communication with instrumentality 20, without passage of any communications waves through a portion of the user's body. The use of this embodiment is illustrated in FIG. 6. Such embodiment may be used, for example, in situations in which security of the communications is not as great a concern, as in certain applications of the previously described first embodiment, and/or for activation of an instrumentality 20 which may not be conveniently or safely be touched by the user. The transmitting means 30 and the receiving means 32 are on the edge of wristband 12, rather than inside it against the user's skin 14, so that the communications between PAC 10 and instrumentality 20 may be accomplished with the waves passing directly through the space between them. FIG. 7 illustrates the use of this FIG. 5 embodiment of the PAC in the control of a smart door lock. Since this embodiment lacks the security means for the communications, provided by the first embodiment in which the waves pass entirely through a portion of the user's body in travelling between the PAC 10 and the instrumentality 20, an alternate communications security means may be provided, if needed, by encryption of the communications, in a manner well known in the encryption art.

As to security it should also be understood that the PAC 10 itself is secure in that it does not provide any means whereby its own programming and functions may be changed by signals received from the instrumentality 20 or other outside source.

And, as noted in the background section, another security advantage of the invention is that the authorized person identity authentication signal, sent by PAC 10 to instrumentality 20, will be a signal which will not contain the information which was received by the PAC 10 from the user and used by the PAC 10 to determine that the user is the authorized person.

Figure 8:
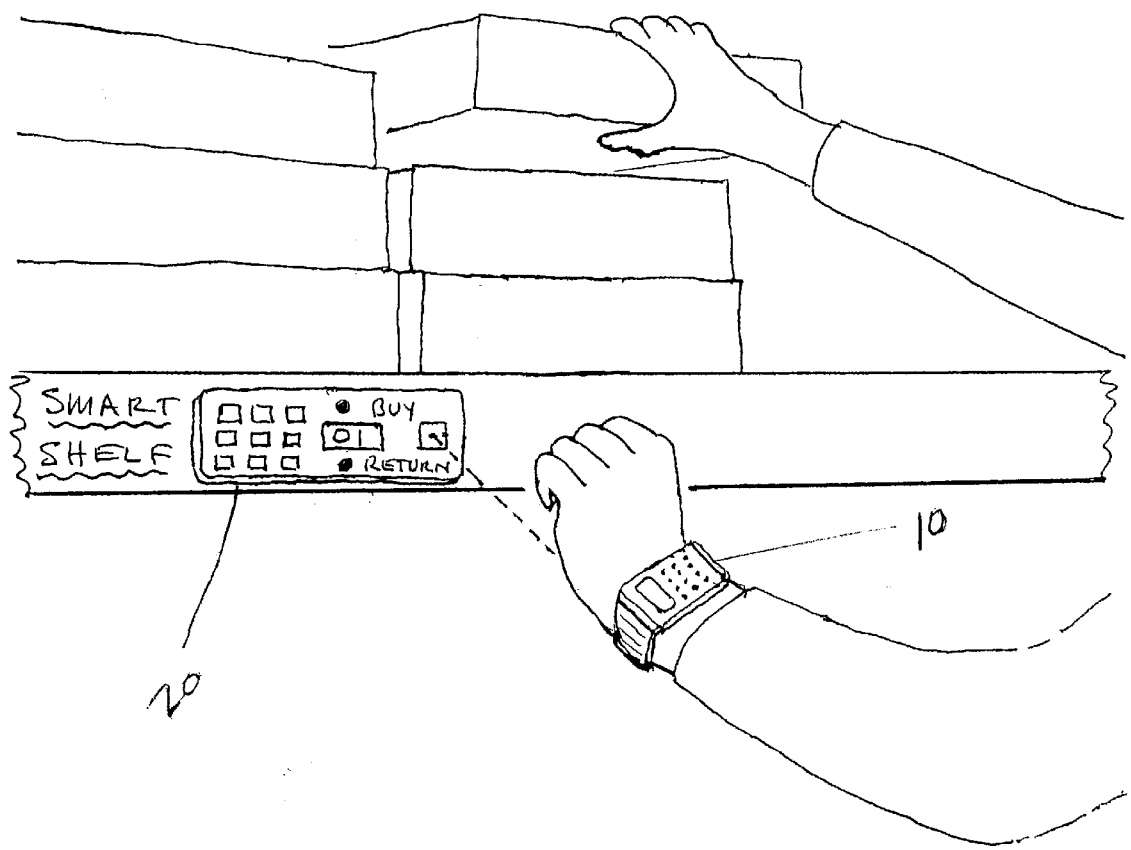
FIG. 8 illustrates use of the FIG. 5 embodiment of the PAC, in a system allowing purchase of items directly from smart store shelves.

As a further illustration of the wide variety of instrumentalities 20 with which the PAC 10 might be used in different embodiments of the invention, FIG. 8 illustrates possible use of a worn version of the PAC, of the form shown in FIG. 5, in a system allowing the authorized person to purchase an item directly at a smart shelf in a store. The smart shelf would contain a terminal constituting part of instrumentality 20, which would communicate with PAC 10, for recording the authorized person's purchase and form of payment, e.g. credit card or bank debit card account; the instrumentality 20 would in this case also contain additional means (not shown) for recording the actual removal of the purchased item from the store shelf, e.g. a bar code scanner behind the array of products on the shelf, or an electronic weight scale, contained within the shelf, detecting removal of the item from the shelf.

Figure 9:
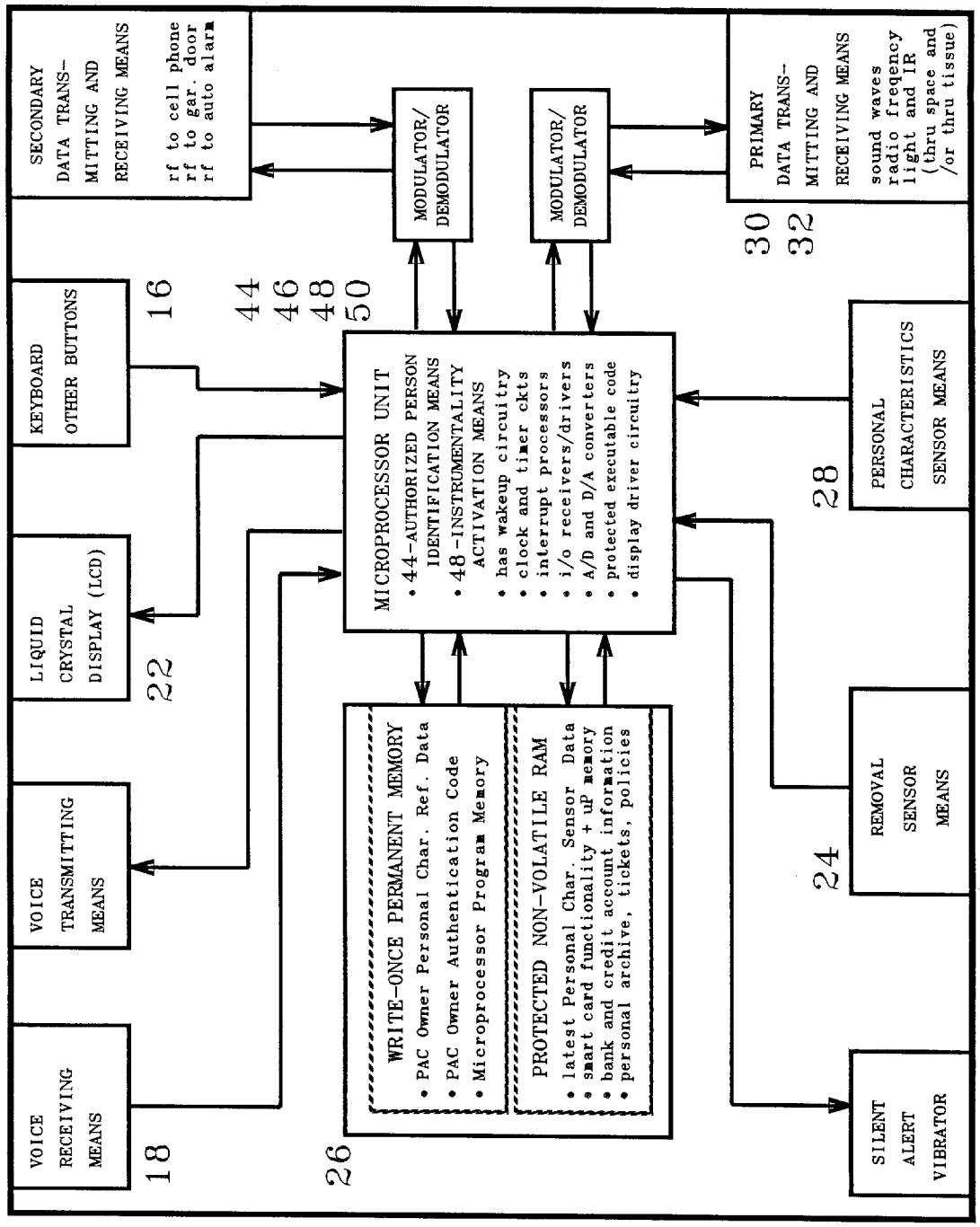
FIG. 9 shows functional relationships of components of the PAC, applicable for both embodiments shown in FIGS. 1 and 5. The PAC shown is relatively complex; a simpler version is described below in FIG. 20.

An indicated in FIG. 9, The PAC 10 contains electronic data storage means 26, for storage of information received by the PAC 10, and an authorized person identification means 44, contained in an authorized person identification microprocessor 46, which authorized person identification means 44 is software programmed, in a manner well known in the software programming art, for performing the functions of continually monitoring and determining whether or not the PAC 10 is currently being worn by the authorized person, through analysis of the most recently received user-identifying data and through comparison of said data with reference data identifying the authorized person, and through determination of whether any removal signal was received from removal sensor means 24 into data storage means 26, after receipt of the most recent data identifying the user as the authorized person. The authorized person identification means 44 may also be programmed to further comprise a periodic challenge means, requiring the user to periodically reenter valid authorized person identifying data, using keypad 16, or by voice exemplar for voice profile analysis, using voice receiving means 18. This feature of the programming of the software of authorized person identification means 44 can provide redundancy in event of failure of the removal sensor means 24 to sense removal of PAC 10 from contact with the authorized person, through either malfunction or an intentional defeating of the operation of removal sensor means 24. Said software of authorized person identification means 44 is also programmed to communicate to transmit to instrumentality 20 through the above-described communication means, an authorized person identification authentication signal, if and only if the PAC 10 is currently being worn by the authorized person.

And the PAC 10 also includes an instrumentality activation means 48, for allowing the wearer to use the PAC 10 to send an instrumentality activation signal to the instrumentality 20, said means comprising, in addition to the voice receiving means 18, for voice activation of instrumentality 20, and keypad 16 for non-voice activation of instrumentality 20, software in a. PAC microprocessor 50 programmed in a manner well known in the software arts, to recognize the authorized person's activation command input and to cause the instrumentality activation signal to be transmitted to instrumentality 20.

The instrumentality 20 comprises, in addition to an action performance feature 52 to allow performance of some action desired by the user of the PAC 10, an instrumentality authorized person recognition means 54, which comprises software and data storage means, in communication with the PAC 10 through the communication means described above, for allowing activation of the action performance feature 52 of instrumentality 20 upon receipt of an instrumentality activation signal if and only if the PAC 10 is currently being used by the authorized person. This may be accomplished in the manner further detailed below.

2. Structural and Operational Details

Since the electromagnetic waves used in communications between the PAC 10 and the instrumentality 20, are used for communication purposes only and not for power transmission purposes, one may of course employ very low power levels for the wave generation, so as to avoid any risk of harm to the user from long term exposure to the waves, particularly for use of the embodiment in which the waves pass through body tissue of the user. With suitable receiving detector sensitivity, it is expected that only microwatt or at most milliwatt power levels would be necessary.

The removal sensor means 24, may conveniently be in the form of a capacitance sensor, sensing a change in the capacitance between PAC 10 and the skin 14 of the user, as removal occurs. It may readily be seen from the above description of the principal embodiments, that authorized person identification authentication may be accomplished continually, on an effectively continuous basis, in three basic ways: (1.) By employing personal characteristics sensor means 28 and authorized person identification means 44 of PAC 10 to continually recheck unique authorized person-identifying characteristics at whatever recheck frequency is desired; (2.) By requiring re-authentication of authorized person identity immediately after receipt of a removal signal from removal sensor means 24; and (3.) By periodically requiring the user to reenter valid authorized person-identifying data, and thus offering redundancy in case of possible failure of functions (1.) and (2.)

The operation of the instrumentality's authorized person recognition means 54 may be accomplished by programming the software of that means, in a manner well known in the software programming arts, to determine whether an authorized person identity authentication signal is received by means 54 from PAC 10, within a predetermined short time interval before or after receipt of an instrumentality activation signal. The time interval chosen would be short enough, e.g. ¹⁄₁₀ sec., to avoid any significant risk that the authorized person identity authentication was not valid at the time of issuance of activation command. Alternatively, the software of means 54 may be programmed, in a well known manner, to send an interrogation signal to PAC 10 immediately after receipt of an instrumentality activation signal from PAC 10, asking for PAC 10 to send to instrumentality 20 and means 54, an authorized person identity authentication signal, and for determining whether said signal is received from PAC 10 within a predetermined short time interval, e.g. ¹⁄₁₀ sec., after transmission of the interrogation signal.

Figure 10:
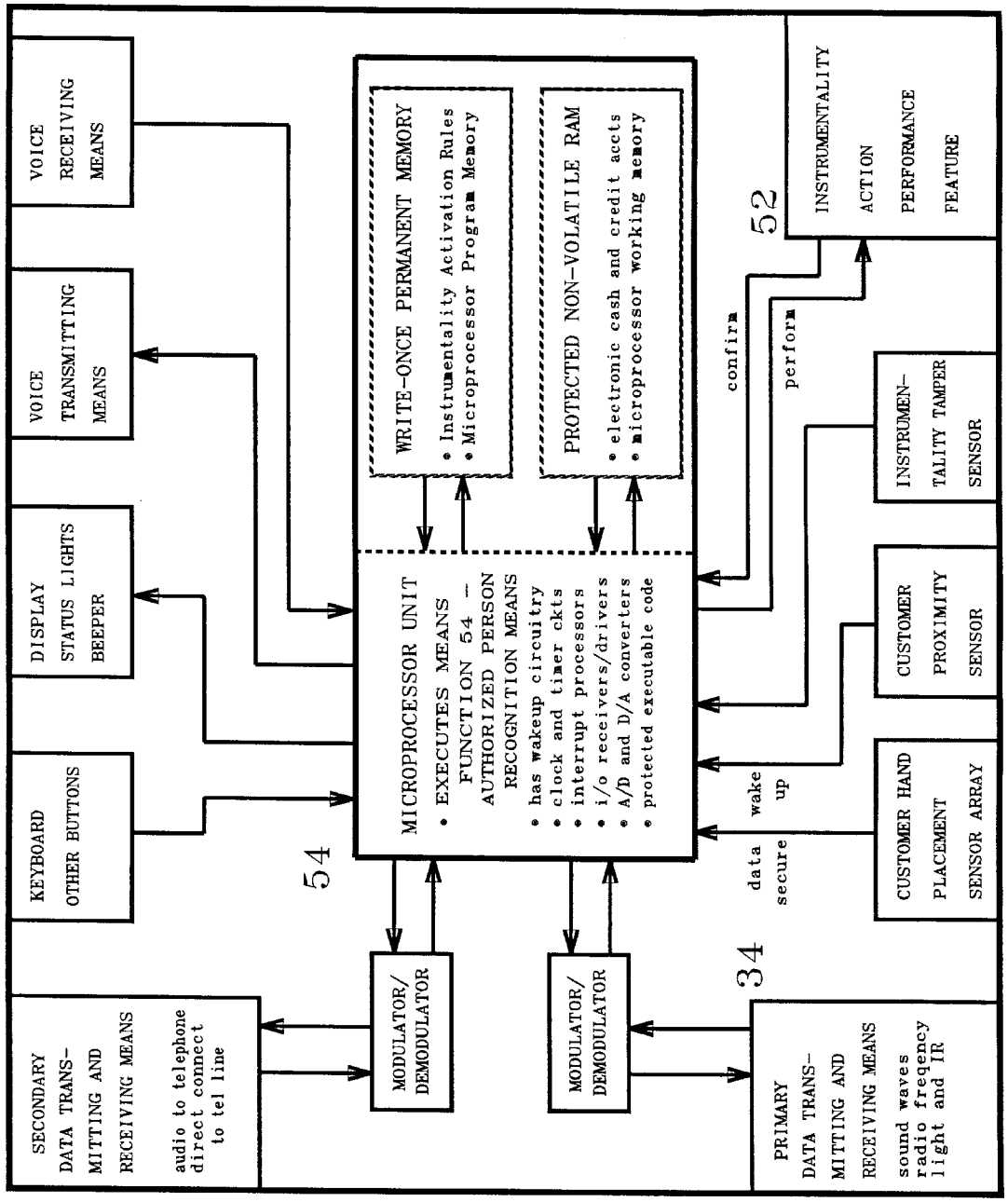
FIG. 10 shows functional relationships of the "smart" section of an instrumentality. The version shown is relatively complex; a simpler version is described below in FIG. 21.

The general functional relationships of the components of the invention, for the various embodiments discussed above, are schematically illustrated in FIG. 9 for the PAC 10, and FIG. 10 for the instrumentality 20.

3. Some Possible Variations of Structural Details and Applications of the Invention Those familiar with the art will appreciate that the invention may be employed in configurations other than the specific forms disclosed above, without departing from the essential substance of the invention. For example, and not by way of limitation:

Though electromagnetic waves may be used in communications between the PAC 10 and the instrumentality 20, it is to be understood that they need not be limited to any particular frequency or to any particular part of the electromagnetic spectrum. For the embodiment in which the waves pass through a portion of the user's body, said waves may be, depending upon the path length, body tissue transmission characteristics, power levels used, and detector sensitivity, be waves in the radio, infrared or visible light portions of the spectrum, for example. Similarly waves in any such parts of the spectrum may be used in the embodiment in which the waves pass through the air between the PAC 10 and the instrumentality 20.

Nor is it always necessary that electromagnetic waves be used; sound waves might instead by used, in either above-described embodiment of the invention, at least where air or another sound-transmitting medium (e.g. water) is present between the PAC 10 and instrumentality 20 in the embodiment involving direct wave communication between them, as opposed to the embodiment using communication through the user's body, where sound could also generally be used.

And, the personal characteristics sensor means 28, is not necessarily limited to the above-described means for sensing distinctive user characteristics by analysis of fingerprint patterns, but might instead be any means for sensing other distinctive, identifying user characteristics, e.g. retinal patterns or voice profiles.

Persons familiar with the art will understand that details of apparatus and methods for sensing distinctive personal characteristics by measurement of fingerprint patterns, retinal patterns, and voice profiles, are disclosed in prior United States patents, including the following U.S. patent disclosures which are each incorporated herein by this reference:

Fingerprint Patterns—U.S. Pat. No. 5,796,858, on invention of Zhou et al, FIGS. 1–9, and text at col. 1, line 43-col. 8, line 28; U.S. Pat. No. 5,852,670, on invention of Setlak et al, FIGS. 1–26 and text at Col. 2, line 61-col. 14, line 67; U.S. Pat. No. 5,963,679, on invention of Setlak, FIGS. 1–26 and text at col. 2, line 60-col. 15, line 17;

Retinal patterns—U.S. Pat. No. 5,845,733, on invention of Wolfsen, FIGS. 1–6 and text at col. 1, line 38-col. 4, line 63; U.S. Pat. No. 5,949,521, on invention of Williams et al, FIGS. 1–4 and text at col. 2, line 38-col. 8, line 34; U.S. Pat. No. 5,956,122, on invention of Doster, FIGS. 1–8 and text at col. 2, line 31-col. 8, line 46;

Voice Profiles—U.S. Pat. No. 4,078,154, on invention of Suzuki et al, FIGS. 1–12 and text at col. 1, line 44-col. 4, line 51; U.S. Pat. No. 5,608,784, on invention of Miller, FIGS. 1–2 and text at col. 1, line 56-col. 6, line 43; U.S. Pat. No. 5,623,539, on invention of Bassenyemukasa et al, FIGS. 1–7 and text at col. 2, line 22 -col. 11, line 11; and U.S. Pat. No. 4,234,868, on invention of Radice, FIGS. 1–4 and text at col. 1, line 4-col. 4, line 38.

Whether one is using the methods of looking at the user's voice profile or looking at fingerprint or retinal patterns of the user, the software of authorized person identification means 44 of PAC 10 may be programmed in a manner well known in the software programming arts, to compare the pattern observed by the personal characteristics sensor means 28 at a given time, with an appropriate reference pattern identifying the authorized person, previously stored in the data storage means 26.

As to the use of the plural form "characteristics" in the language "a personal characteristics sensor means, for sensing unique identifying personal characteristics of said user, and for communicating data representing said characteristics to said data storage means", used in the claims and invention summary, it should be recognized that a fingerprint pattern is made up of numerous individual specific characteristics, as is a retinal pattern, as is a voice profile. Use of the plural form "characteristics" recognizes that fact, and is not to be understood as meaning that multiple methods of personal characteristics sensing are necessarily employed in any embodiment of the invention, e.g. fingerprint plus voice profile, though they of course might be, for enhanced identification security.

Although forms of personal characteristics sensor means 28 which function by sensing a voice profile or a fingerprint pattern of the user, would normally require some action by the user each time a sensing is done, e.g. speaking to give a voice exemplar or applying a finger to sensor means 28 to give a fingerprint pattern, it is of course possible to use a personal characteristics sensor means 28 which does not require any action by the user, e.g. one employing retinal pattern scanning, which requires only that the user's eyes be open.

The removal sensor means 24, could be a capacitive sensor, but might instead be, for example, a pulse monitor, or an ultrasonic Doppler blood flow monitor, or a simple switch contained in a two-part wristband 12, indicating removal of wristband 12 from the user's wrist.

The data storage means 26 of PAC 10 may, for particular embodiments and applications, conveniently include an insertable smart card or chip, which may be inserted within PAC 10, and which may include for example, reference identifying data regarding the authorized person, such as, for example, fingerprint pattern information, retinal pattern information, or voice profile information.

Some variations of possible embodiments and applications of the invention are nonexclusively illustrated in FIGS. 5–11.

Figure 11:
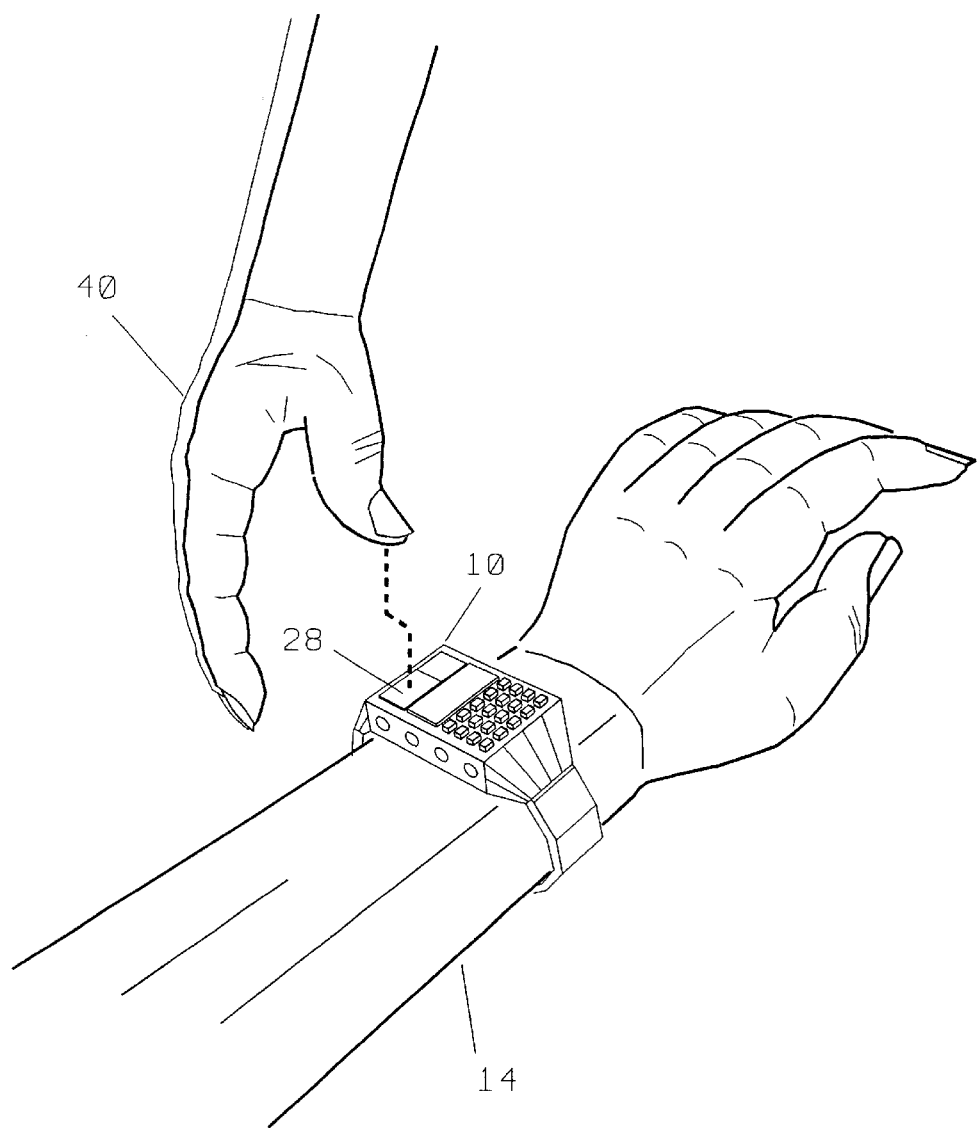
FIG. 11 illustrates use of an embodiment of the PAC in which the personal characteristics sensor means comprises a means for sensing the fingerprint pattern of the wearer.
Figure 12:
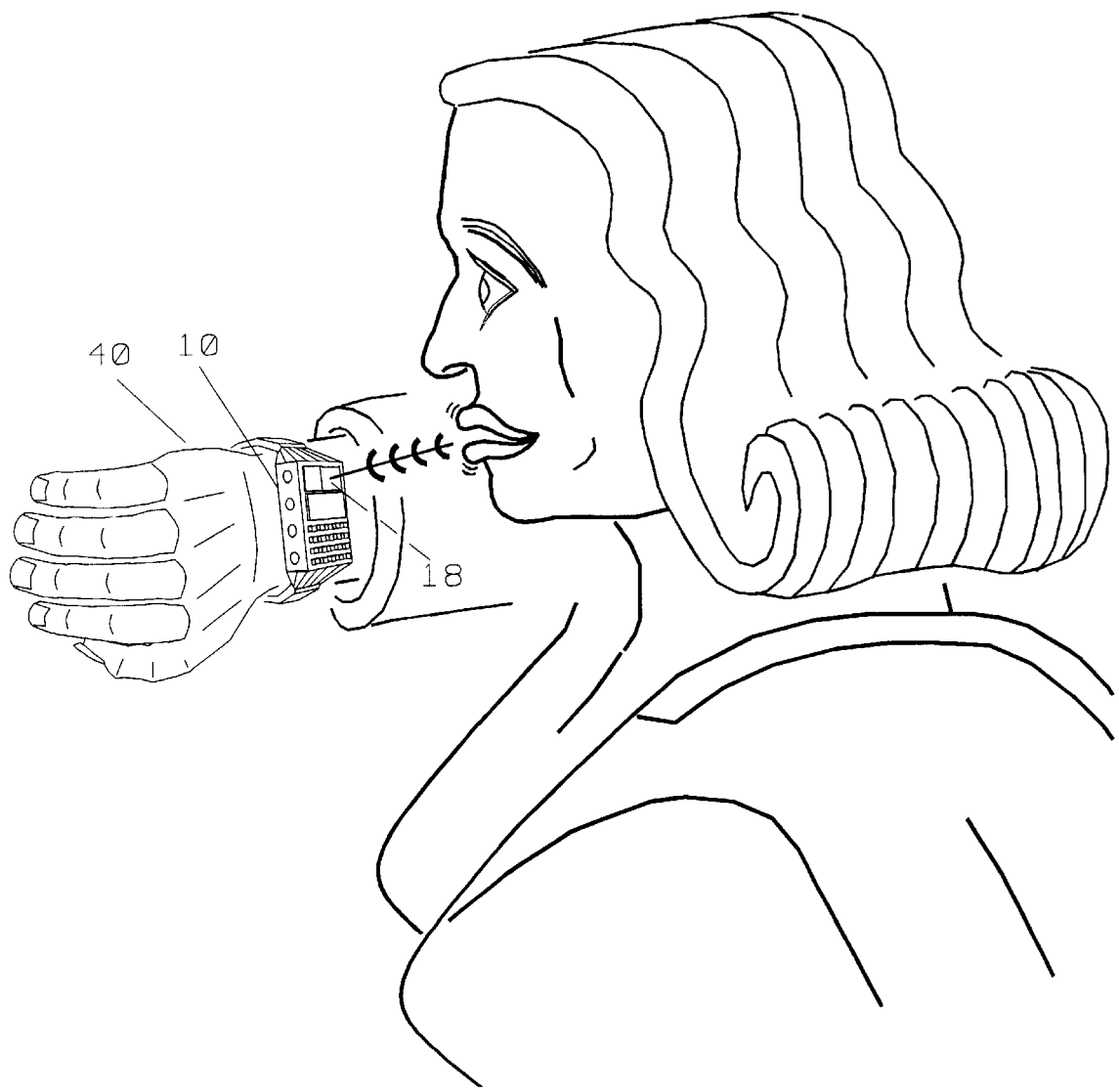
FIG. 12 illustrates use of an embodiment of the PAC in which the personal characteristics sensor means comprises a means for analysis of the voice profile of the wearer.
Figure 13:
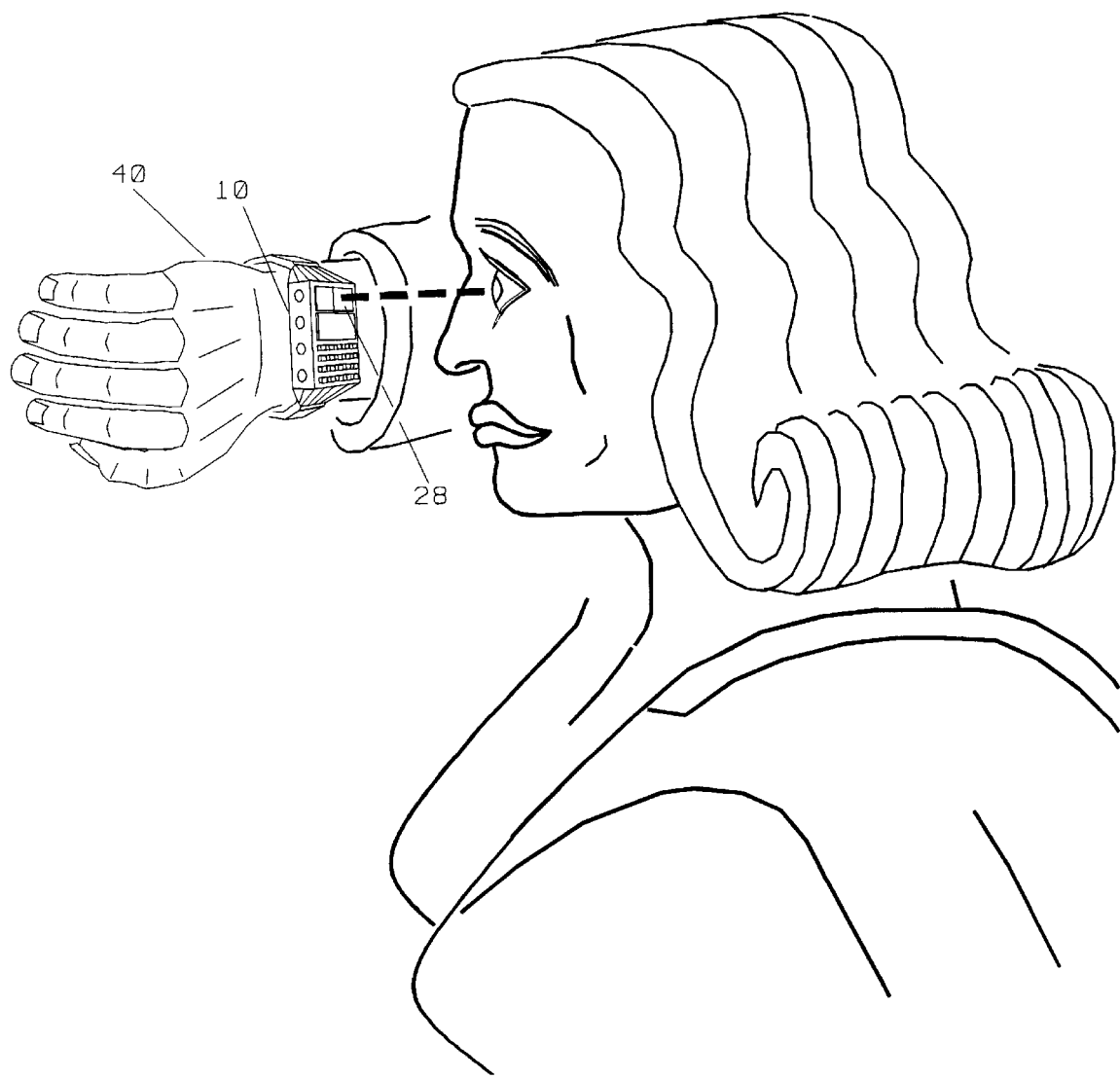
FIG. 13 illustrates use of an embodiment of the PAC in which the personal characteristics sensor means comprises a means for analysis of the retinal pattern of the wearer.

FIGS. 11, 12 and 13 illustrate use of embodiments in which the personal characteristics sensor means comprises, respectively means for sensing a user fingerprint pattern, voice profile, and retinal pattern, as discussed above.

Figure 14:
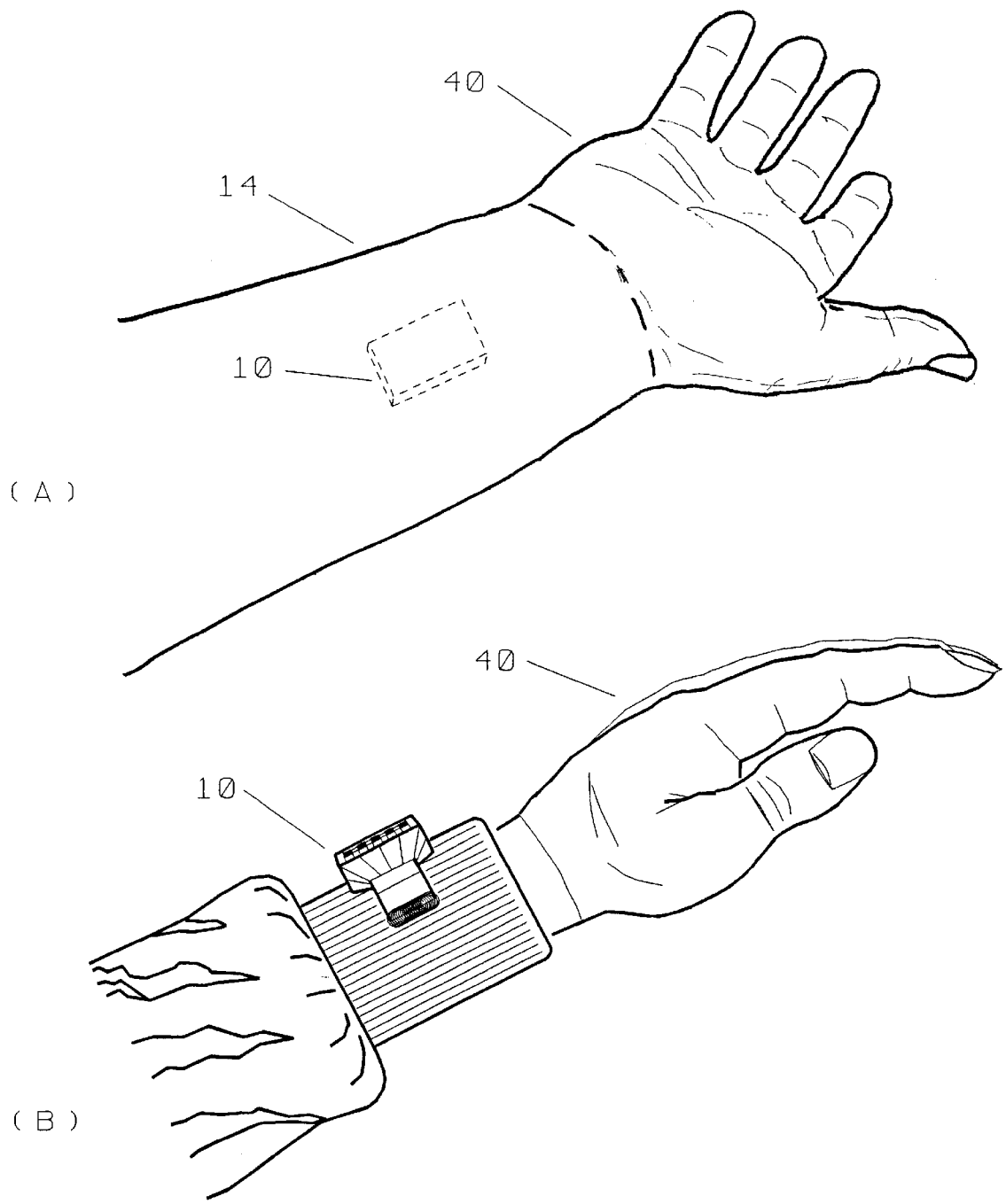
FIG. 14A shows an implanted version of the PAC, which could be voice activated and communicate via infrared or sound waves.
FIG. 14B shows a PAC incorporated in a garment sleeve, with skin contact available as an option.

Though the wristband 12 has been disclosed as the wearing means for conveniently allowing the user to wear the PAC 10, other wearing means might be employed instead, as indicated in FIG. 14. The PAC 10 might for example be sewn into an elastically contracted garment sleeve, so as to be in contact with the user's arm whenever the garment was worn (FIG. 14B); Or, for some high security applications, the PAC 10 might have a portion thereof implanted within the user's body, with the keypad 16 and voice receiving means 18 at or close to the skin surface (FIG. 14A). Alternatively, the PAC 10 may be incorporated in a necklace, necklace pendant, belt, ring, glove, or eyeglasses frame. A greater variety of wearing means will be usable, of course, for the embodiment in which the PAC 10 need not be in contact with body tissues of the user, i.e. where the PAC 10 and instrumentality 20 communicate directly through space. For that embodiment the PAC 10 need not necessarily be worn at all, and might be offered as a separate, hand-operated device to meet certain needs, as discussed below. It is believed generally preferable, however, to use a worn version of the PAC 10, to insure that it will always be available to the user when needed, and to facilitate authentication of authorized person identity by those methods requiring contact between the PAC 10 and the skin 14 of the user's body.

Although there is great flexibility in the various wearing and carrying modes of the PAC, the search for its most convenient embodiment should include the consideration that certain wearing means and personal characteristics sensor means will make it possible for the PAC to be self-authenticating, that is, able to monitor and recognize personal characteristics of its owner continually without requiring any action on the part of its owner.

This affords the ultimate in convenience, security, and immediate availability for time-critical needs.

Figure 15:
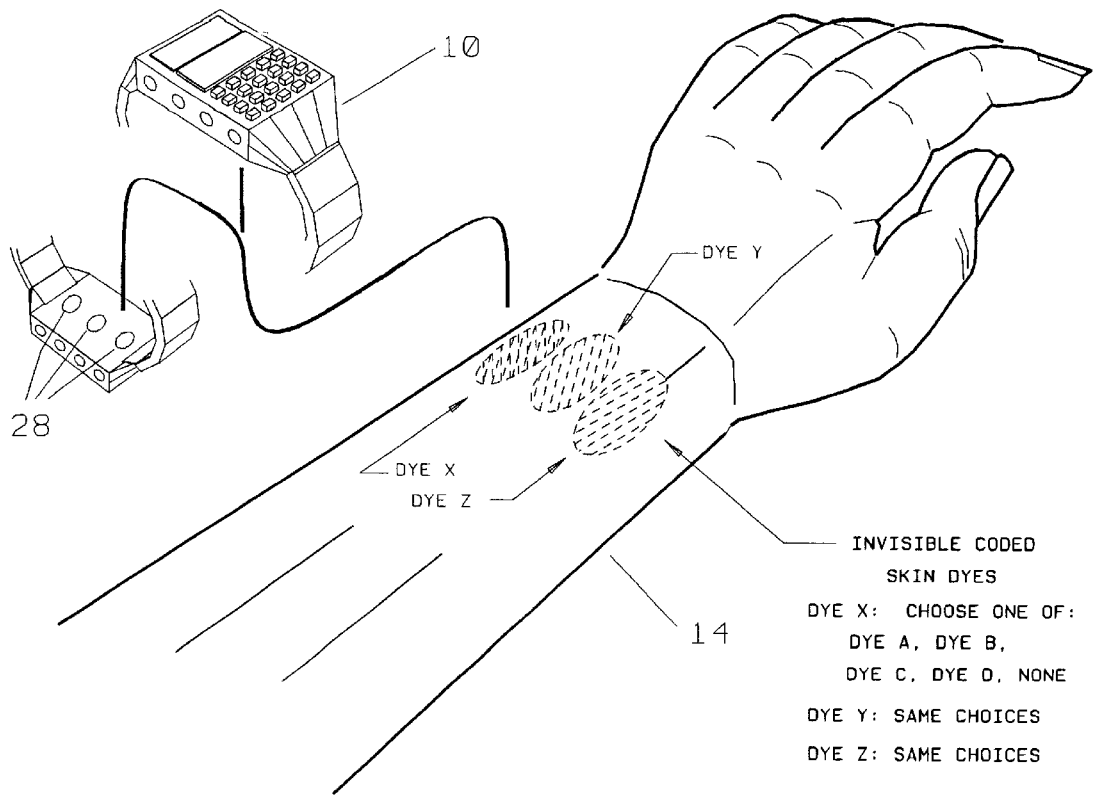
FIG. 15 shows a worn version of the PAC which senses an invisible coded dye pattern in order to recognize and monitor the presence of its owner. Here authentication can occur automatically without need for owner action.
Figure 15:
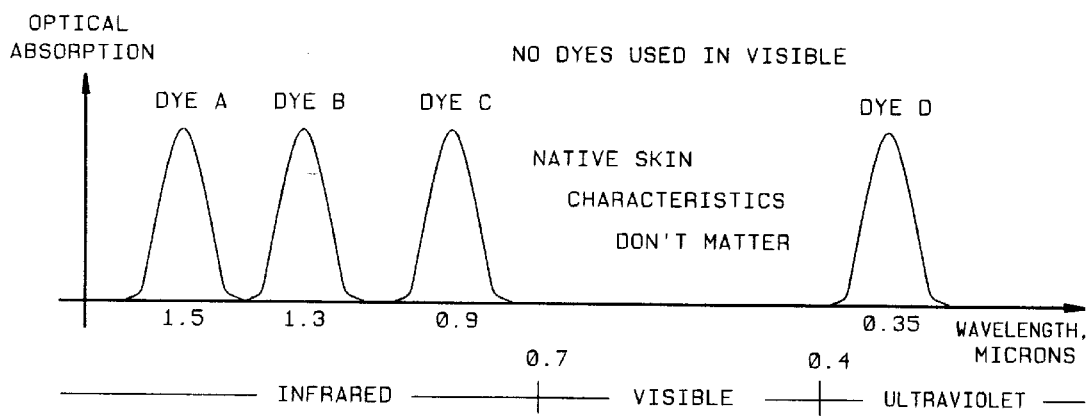
Figure 16:
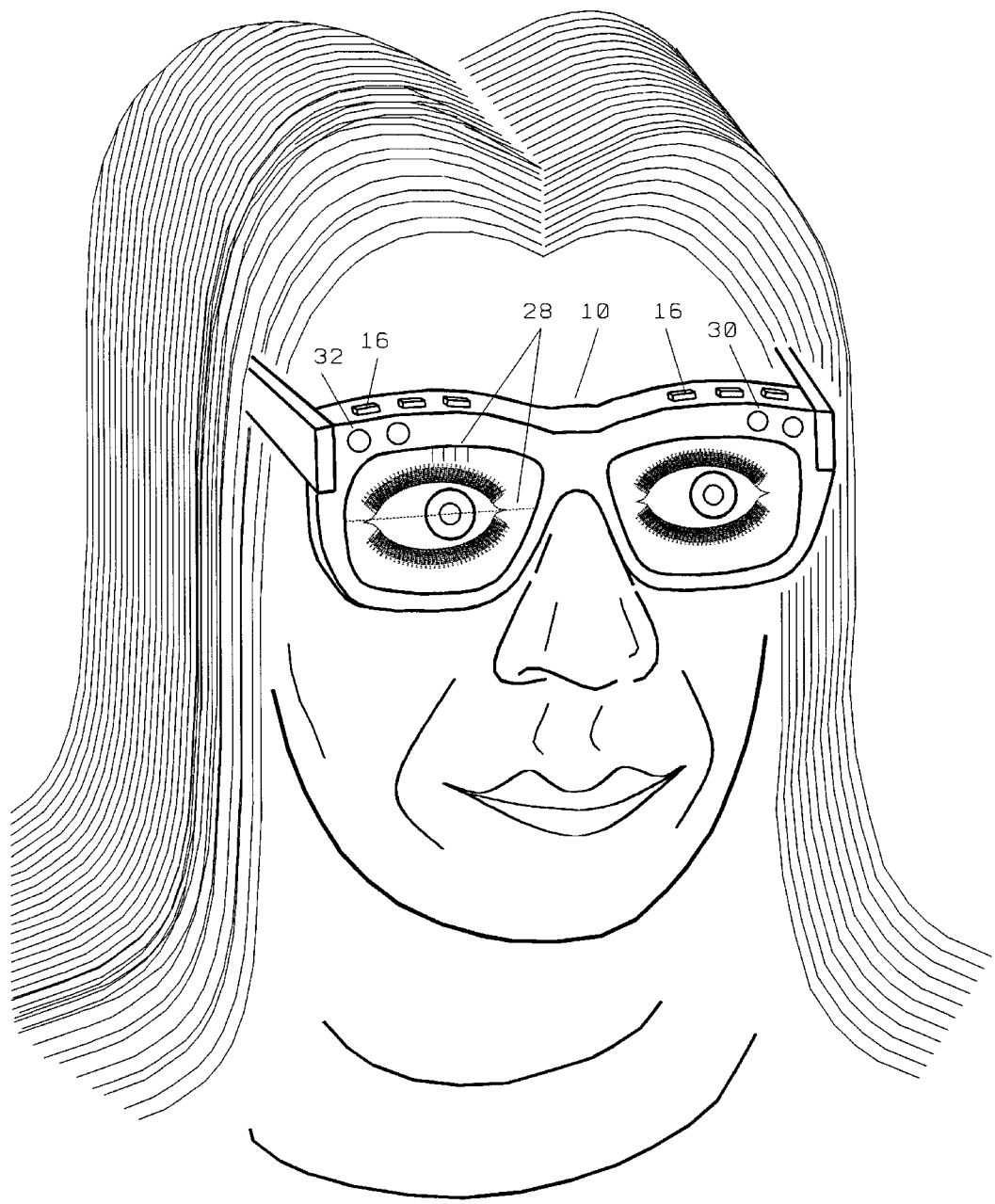
FIG. 16 shows a version of the PAC incorporated in an eyeglass frame. The lenses incorporate beamsplitters which permit retinal scanning in the infrared and also display of information by projection on the retina. Here authentication can occur automatically without need for owner action.

With present technology, a self-authenticating PAC could be made to recognize its owner based on an invisible pattern of skin dyes, as illustrated in FIG. 15. Such dyes could be made permanent or renewable according to need and preferences of the user. Alternatively, a self-authenticating PAC could be realized using retinal scanning. Current optical display technology is at the point where a retinal scanning unit and a visual display device could be integrated into an eyeglass frame together with the other elements of PAC 10, resulting in the concept illustrated in FIG. 16 (and see drawing description for FIG. 16). Here the fact that the ports for the transmitting means 30 and receiving means 32 are naturally pointed at the item of interest by the user would avoid hand motion for devices that could be activated without necessarily being touched, such as automatic doors and merchandise vending instrumentalities, thus adding further to the convenience afforded by self-authentication.

Figure 17:
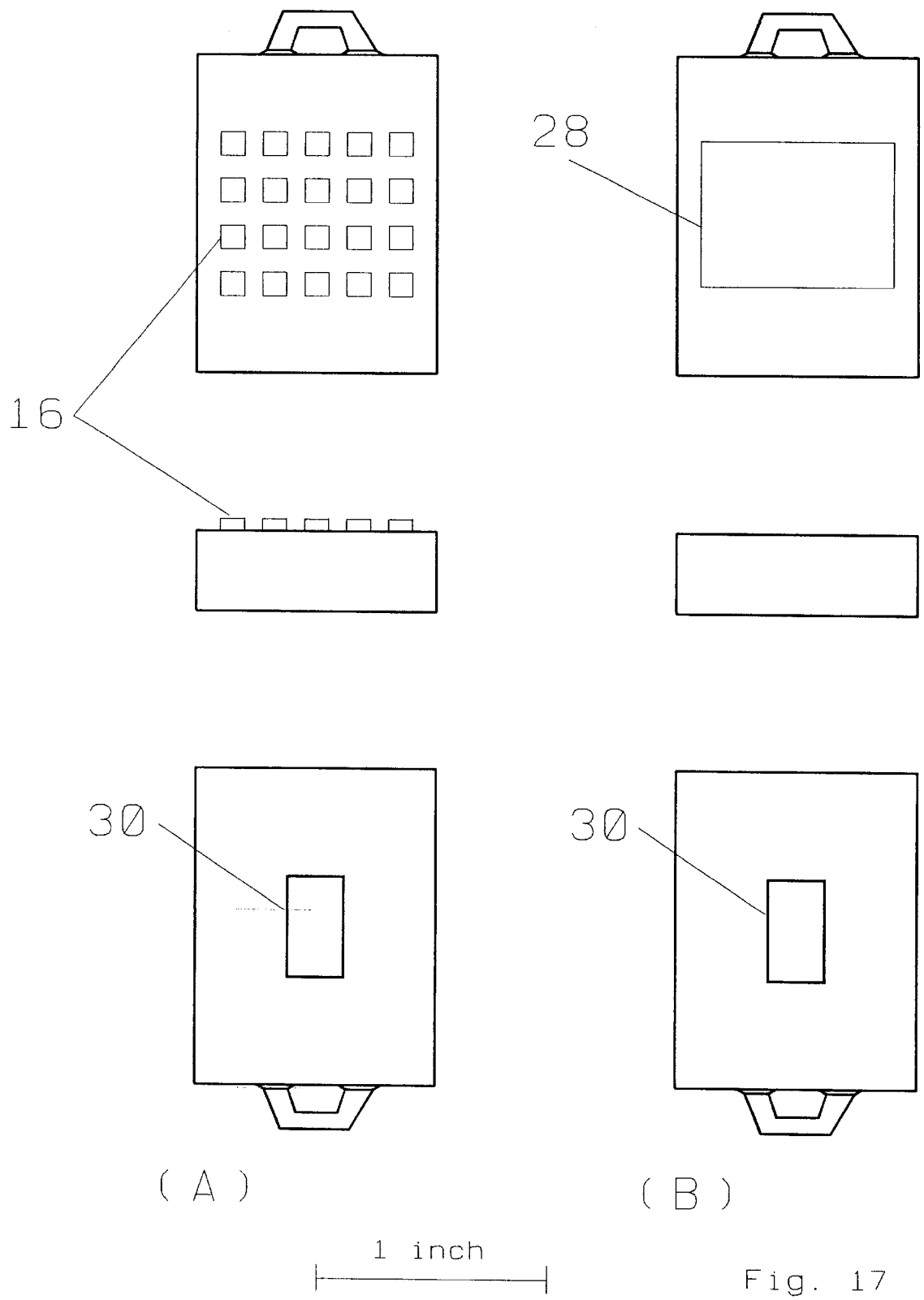
FIG. 17 shows simple versions of a non-worn PAC which are inexpensive to manufacture but require the owner to authenticate for each transaction. The version of FIG. 17A accepts a user code number to verify identity; the version of FIG. 17B authenticates upon presentation of a matching fingerprint.

Most of the preceding describes PAC versions causing minimal user inconvenience. It is normally desirable to not require the user to authenticate his identity at the moment of need, which could be time critical in the case of gun control. But for other applications involving occasional use, where the PAC may be an expendable item in hostile hands, a very cheap PAC with no authentication memory would be desirable, which does require user identity authentication at the time of need. FIG. 17 shows two versions of a very simple non-worn PAC having the essential capability of providing positive user identification. FIG. 17A shows a simple PAC showing only a keypad and a transmitting means. When the user verifies his identity, as the authorized person, by entering the correct number on the keypad, this PAC responds by a statement confirming the user's identity as the authorized person, i.e. an authorized person identity authentication signal, to a remote instrumentality. That statement does not transmit the number, e.g. a PIN number, which the user-inputs to the PAC; only a separate authorized person identity authentication signal, recognizable by the instrumentality. And even with such a simple PAC, other appropriate communication security measures, discussed above, e.g. encryption, may be employed. One such authorized person identity authentication signal is produced per correct number entry, and there is no stored memory of authentication for future use. Such a simple PAC could be used in financial transactions over standard phone lines, with the user employing the PAC only to authenticate his identity, and otherwise arranging all transaction details, e.g. verbally, without use of the PAC. FIG. 17B shows a similar simple non-worn PAC, which is instead authenticated by the user's fingerprint, producing one authorized person identity authentication signal each time the fingerprint is identified as that of the authorized person.

Figure 18:
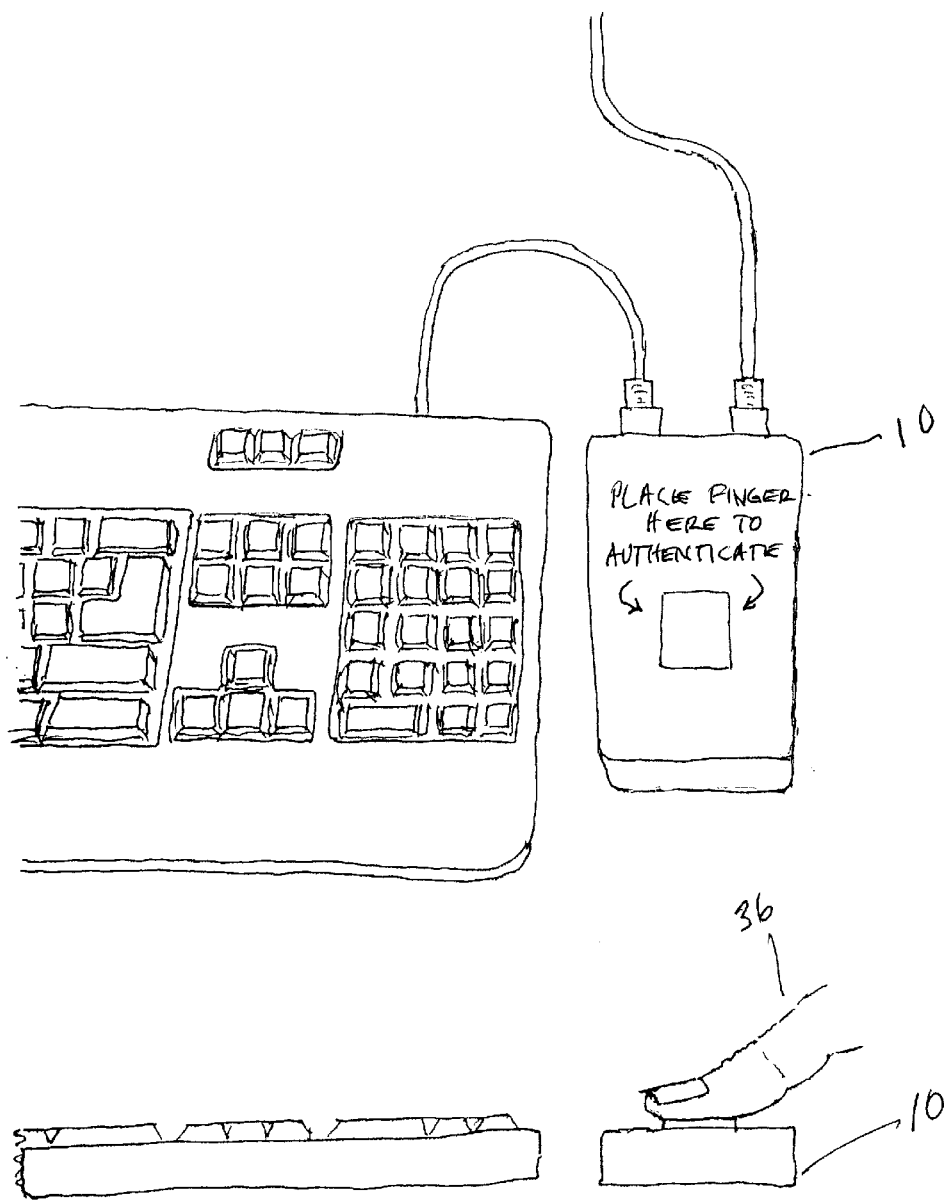
FIG. 18 shows a simple non-worn PAC which authenticates via thumbprint, used in conjunction with a computer. The same PAC could be used to activate the computer and to transact, through the computer, with a remote instrumentality to which the computer is connected.

FIG. 18 illustrates a similar non-worn version of a very simple PAC, used in connection with a personal computer, in which the user could hold down a thumb on the PAC for fingerprint recognition which would produce a single authentication statement, with other details of the transaction entered through the computer keyboard.

With reference to uses of the PAC with a computer system that communicates by a phone line with an external instrumentality, there are a variety of possible choices as to the location and nature of a non-worn form of PAC. The PAC could be located in the phone line, or in a line to the keyboard (as in FIG. 18) or modem. Or the PAC could be located in a plug in card, or incorporated into a modem or into a protected area of the computer processor itself.

Figure 19:
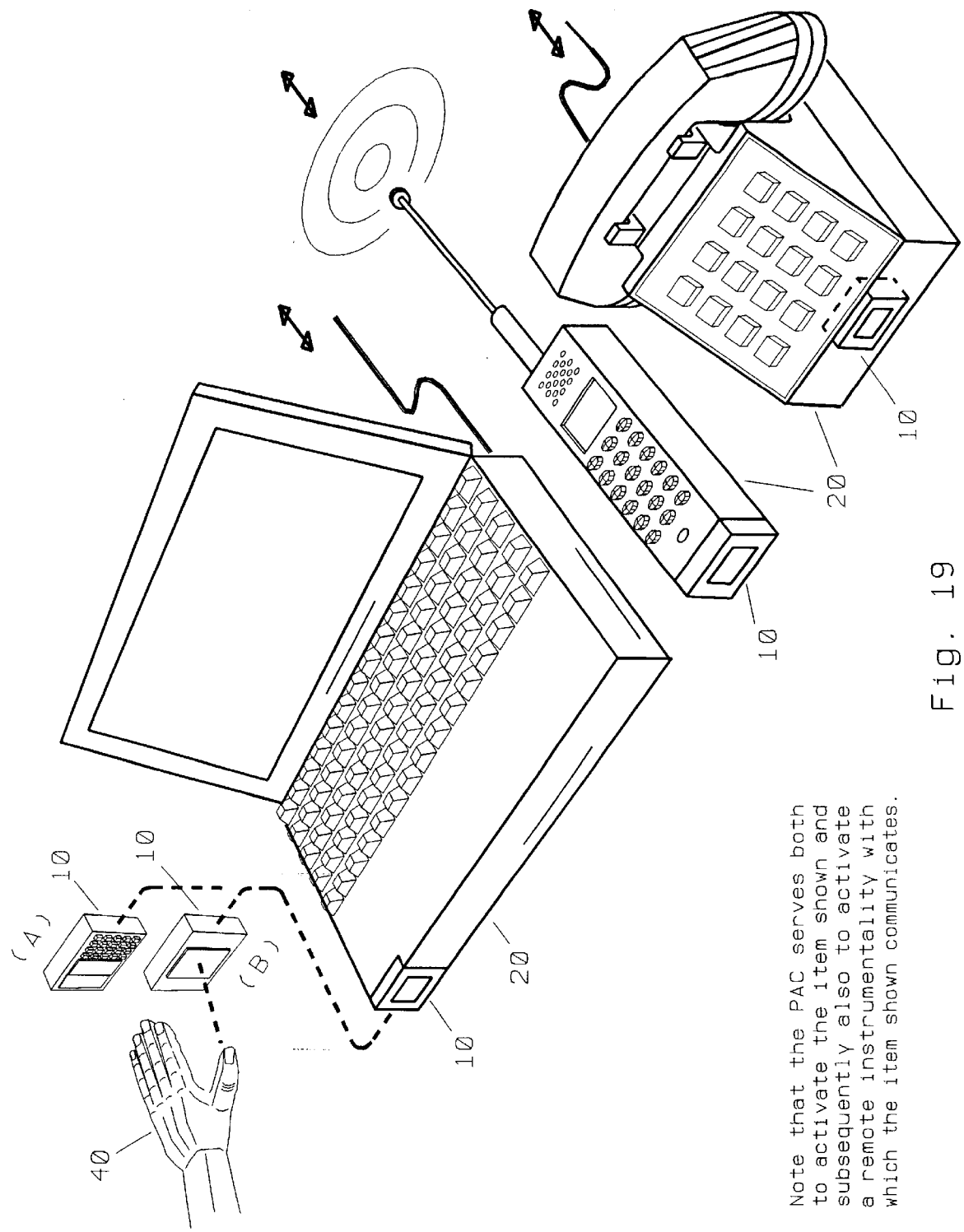
FIG. 19 shows incorporation of the PACs of FIG. 17 in a computer, or in a wireless or cell phone, or in a conventional telephone. In all cases the PAC may be used both to activate the local item initially, and then to transact with a remote instrumentality by communication through the local item.

FIG. 19 shows use of the simple, non-worn PAC of FIG. 17 in conjunction with a computer, a cell phone, and a conventional telephone. The PAC could be held next to or built into the devices shown and could serve both to initially activate the devices shown and subsequently to communicate authenticated user identification to a remote instrumentality.

Figure 20:
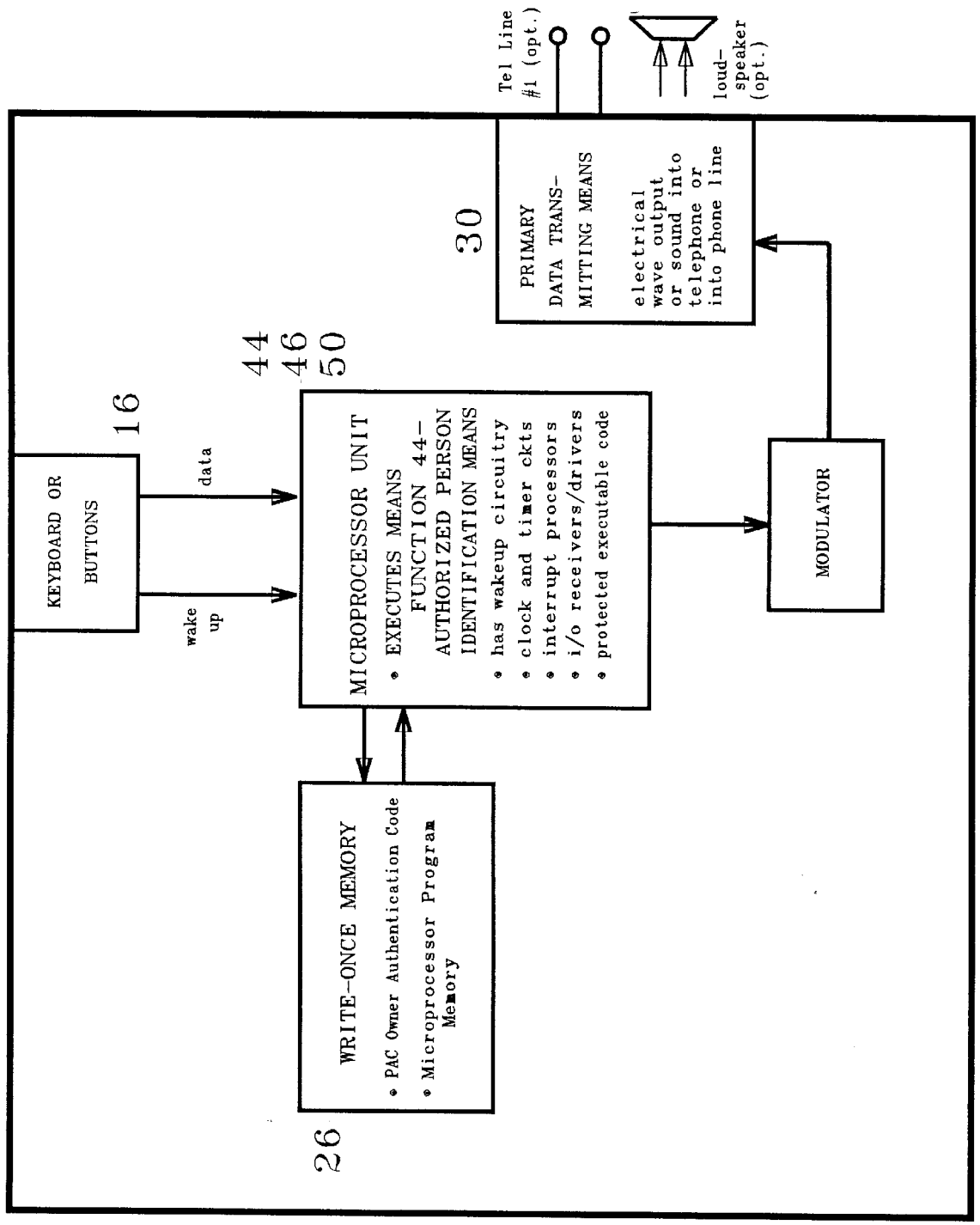
FIG. 20 shows functional relationships of components of a relatively simple non-worn PAC, applicable to both embodiments of FIG. 17.
Figure 21:
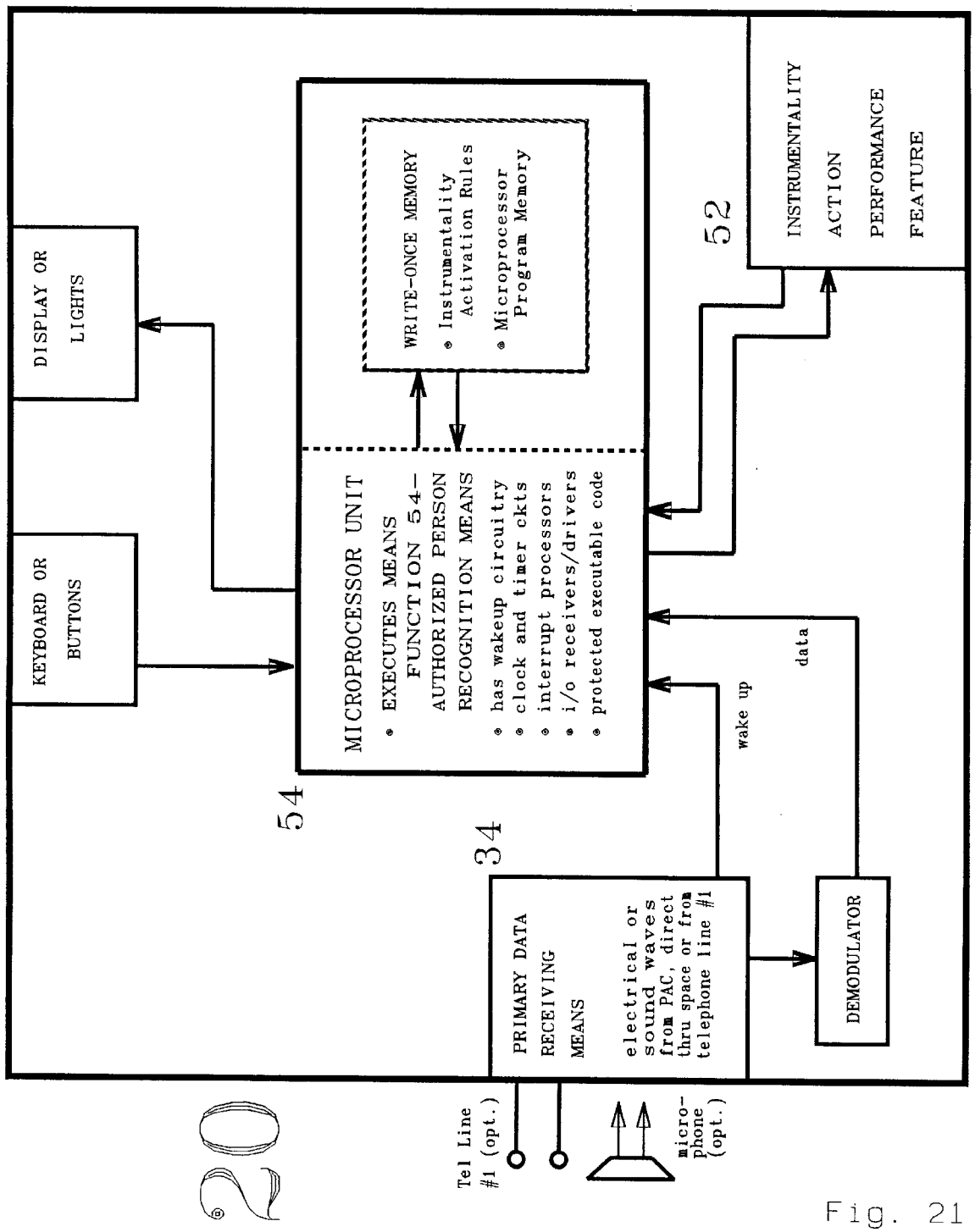
FIG. 21 shows functional relationships of the "smart" section of a relatively simple instrumentality.

FIGS. 20 and 21 illustrate block diagrams for PAC and instrumentality embodiments of low complexity which may be fabricated during early stages of evolution of the technology.

Because of the great variety of instrumentalities with which different embodiments of the invention may be used, some embodiments will not require all of the elements disclosed above. For example, although use of the invention with a remote financial system will normally call for using an embodiment of PAC 10 allowing a user to send an instrumentality activation signal to instrumentality 20, as described above, and having a user information output means whereby the user may receive information from the instrumentality 20, e.g. regarding approval or completion of a transaction, as also described above, these capabilities would not be required for certain other applications. For example, if the invention is used in firing a smart handgun, no instrumentality activation signal need be sent by PAC 10, since the user attempts activation of the gun by finger pressure on the trigger, whereupon the gun will interrogate PAC 10, asking for an authorized person identity authentication signal to be sent by PAC 10, and the gun will fire only if said signal is received from PAC 10. Nor is there any need, in this application, for PAC 10 to have a user information output means to inform the user that the gun has or has not fired, which will be obvious to the user's senses.

The very wide variation of the instrumentalities with which the invention may be used, and of the functions performed by said instrumentalities, has already been indicated above. Additional illustration of that variation is afforded by considering that such possible applications include secure remote voting by telephone; security in obtaining medical, financial and other confidential information, records and documents, which may be downloaded from a data storage facility constituting instrumentality 20, into the data storage means 26 of PAC 10; secure electronic employee time cards, preventing one person from clocking in for another; and secure reservation, ticketing and payment for entertainment events ticketing and transportation ticketing, with electronic ticketing and other confirmation information being downloaded into the data storage means 26 of PAC 10.

The invention may be used with any instrumentality capable of performing any action desired to be performed by the user of the PAC, provided said instrumentality is capable of both responding to an activation command made by said user by performing said action, and of determining, as a precondition to said response, in the manner described and claimed herein, that said activation command has been issued by said authorized person rather than by an unauthorized person.

The term "authorized person" is used herein, and in the claims, to refer to one who has the right to use the PAC 10 to activate the instrumentality 20 to perform a desired action, at a relevant time. In some cases the authorized person will be the owner of both the PAC 10 and the instrumentality 20, e.g. in the case in which instrumentality 20 is a smart tool or smart handgun belonging to the authorized person who also owns PAC 10. In many cases, however, the authorized person may own PAC 10 but not instrumentality 20, e.g. where instrumentality 20 is owned by a financial firm with which the authorized person has an account, e.g a bank account or credit card account. And, of course, the authorized person may be someone owning neither the PAC 10 nor the instrumentality 20, who is authorized by the owner of the PAC 10 and of such an account, to use PAC 10 for activation of instrumentality 20. The term "authorized person" is intended to be distinguished from the term "user", in that a "user" is a person who attempts to use PAC 10 to activate instrumentality 20, but the user may or may not be an authorized person; and the invention allows said activation to occur only if the user is an authorized person.

The scope of the invention is defined by the following claims, interpreted in light of the specification, including also all subject matter encompassed by the doctrine of equivalents as applicable to the claims.

I claim:

1. Apparatus for allowing only an authorized person to activate an instrumentality capable of performing action desired by a person who is the user of said apparatus, said apparatus comprising:

a Personalized Authenticated Controller means (hereafter "PAC"), communicating with said instrumentality, for authenticating identity of said user as said authorized person and for allowing activation of said instrumentality only by said authorized person for performance of said action, said PAC comprising:
  a user information input means for allowing input of information into said PAC;
  a data storage means, for storing data received by said PAC;
  a PAC microprocessor means, communicating internally with all PAC components, for transferring and formatting data, said PAC microprocessor means further comprising an authorized person identification means, communicating with said data storage means, for continually determining whether said user is said authorized person, through analysis of the most recently received data identifying said user and through comparison of same with reference data identifying said authorized person; and for providing for output from said PAC, of an authorized person identity authentication signal, if and only if said user is said authorized person;
a communication means, for allowing communication between said PAC and said instrumentality;
a wearing means, for allowing said user to wear said PAC in contact with said user's body;
wherein said PAC further comprises a removal sensor means, communicating with said wearing means and said data storage means, for sensing removal of said PAC from said body of said authorized person and for communicating a removal signal indicative of said removal into said data storage means; and wherein said authorized person identification means further comprises means for determination of whether any said removal signal has been received into said data storage means after receipt of the most recent data identifying said user as said authorized person; and
a portion of said instrumentality, comprising:
  an authorized person recognition means, communicating with said PAC, for allowing said instrumentality to carry out said action sought by said user only upon receipt by said authorized person recognition means, of said authorized person identity authentication signal.

2. Apparatus for allowing only an authorized person to activate an instrumentality capable of performing action desired by a person who is the user of said apparatus, said apparatus comprising:
  a Personalized Authenticated Controller means (hereafter "PAC"), communicating with said instrumentality, for authenticating identity of said user as said authorized person and for allowing activation of said instrumentality only by said authorized person for performance of said action, said PAC comprising:
    a user information input means for allowing input of information into said PAC;
    a data storage means, for storing data received by said PAC;
    a PAC microprocessor means, communicating internally with all PAC components, for transferring and formatting data, said PAC microprocessor means further comprising an authorized person identification means, communicating with said data storage means, for continually determining whether said user is said authorized person, through analysis of the most recently received data identifying said user and through comparison of same with reference data identifying said authorized person, and for providing for output from said PAC, of an authorized person identity authentication signal, if and only if said user is said authorized person;
  wherein said PAC further comprises an instrumentality activation means, for allowing said user to send an instrumentality activation signal to said instrumentality, indicating that said user wishes for said instrumentality to carry out said action; and
  a communication means, for allowing communication between said PAC and said instrumentality;
  a portion of said instrumentality, comprising:
    an authorized person recognition means, communicating with said PAC, for allowing said instrumentality to carry out said action sought by said user only upon receipt by said authorized person recognition means, of said authorized person identity authentication signal;
  wherein said instrumentality's authorized person recognition means further comprises a means to determine whether any said authorized person identity authentication signal is received from said PAC within a predetermined time interval before or after receipt of said instrumentality activation signal, wherein said predetermined time interval is at least substantially equal to $1/10$ second.

3. Apparatus of claim 1, wherein said PAC further comprises a user information output means, for allowing output of information from said PAC.

4. Apparatus of claim 1, wherein said PAC further comprises a personal characteristics sensor means, for sensing unique identifying personal characteristics of said user, and for communicating data representing said characteristics to said data storage means.

5. Apparatus of claim 1, further comprising a communications security means, for reducing risk of any unauthorized detection and interference with communications between said PAC and said instrumentality.

6. Apparatus of claim 5, wherein said communications security means comprises means for allowing said PAC and said instrumentality to communicate by a path passing entirely through said user's body, with said instrumentality being in contact with said user's body.

7. Apparatus of claim 5, wherein said communications security means comprises encryption of said communications between said PAC and said instrumentality.

8. Apparatus of claim 1, wherein said instrumentality further comprises an authorized person recognition microprocessor comprising said authorized person recognition means.

9. Apparatus of claim 1, wherein said PAC's authorized person identification means further comprises a periodic challenge means, to require periodic reentry by said user, into said user information input means, of data identifying said user as said authorized person, prior to issuance of any said authorized person identity authentication signal after a time at which said reentry of said data is required by said periodic challenge means.

10. Apparatus of claim 1, wherein said communication means comprises a means of wave communication.

11. Apparatus of claim 10, wherein said communication means comprises a means of communication using electromagnetic waves.

12. Apparatus of claim 10, wherein said communication means comprises a means of communication using sound waves.

13. Apparatus for allowing only an authorized person to activate an instrumentality capable of performing action desired by a person who is the user of said apparatus, said apparatus comprising:

a Personalized Authenticated Controller means (hereafter "PAC"), communicating with said instrumentality, for authenticating identity of said user as said authorized person and for allowing activation of said instrumentality only by said authorized person for performance of said action, said PAC comprising:
- a user information input means for allowing input of information into said PAC;
- a data storage means, for storing data received by said PAC;
- a PAC microprocessor means, communicating internally with all PAC components, for transferring and formatting data, said PAC microprocessor means further comprising an authorized person identification means, communicating with said data storage means, for continually determining whether said user is said authorized person, through analysis of the most recently received data identifying said user and through comparison of same with reference data identifying said authorized person; and for providing for output from said PAC, of an authorized person identity authentication signal, if and only if said user is said authorized person; and
- an instrumentality activation means, for allowing said user to send an instrumentality activation signal to said instrumentality, indicating that said user wishes for said instrumentality to carry out said action;

a communication means, for allowing communication between said PAC and said instrumentality, a portion of said instrumentality, comprising:
- an authorized person recognition means, communicating with said PAC, for allowing said instrumentality to carry out said action sought by said user only upon receipt by said authorized person recognition means, of said authorized person identity authentication signal; and
- wherein said instrumentality's authorized person recognition means further comprises means to send an interrogation signal to said PAC after receipt of said instrumentality activation signal, asking for transmission of an authorized person identification authentication signal, and for determining whether said authorized person identity authentication signal is received by said authorized person recognition means within a predetermined time interval after transmission of said interrogation signal, wherein said predetermined time interval is at least substantially equal to $1/10$ second.

14. Apparatus of claim 1, wherein said wearing means comprises a wrist band, having means for attachment of said PAC to said wrist band, and means for securing said wrist band to a wrist of said authorized person.

15. Apparatus of claim 1, wherein said wearing means comprises a garment containing said PAC, said garment having means to hold said PAC against the skin of said authorized person.

16. Apparatus of claim 1, wherein said user information input means comprises a keypad.

17. Apparatus of claim 1, wherein said user information input means comprises means to allow said authorized person to communicate by voice with said PAC.

18. Apparatus of claim 4, wherein said personal characteristics sensor means comprises means for acoustic sensing of the voice profile of said user.

19. Apparatus of claim 4, wherein said personal characteristics sensor means comprises means for sensing the retinal pattern of an eye of said user.

20. Apparatus of claim 4, wherein said personal characteristics sensor means comprises means for sensing the fingerprint pattern of said user.

21. Apparatus of claim 1, wherein said PAC is located in a phone line between a computer and said instrumentality.

22. Apparatus of claim 1, wherein said PAC is located within a computer.

23. Apparatus of claim 1, wherein said PAC is located within a cellular telephone instrument.

24. Apparatus of claim 2, wherein said instrumentality further comprises means to allow said authorized person to purchase an item at a shelf in a store, comprising means to record said authorized person's decision to purchase said product and to record information as to said authorized person's manner of payment for said product, and to record said authorized person's actual removal of said product from said shelf.

* * * * *